April 20, 1954

C. J. GREINER ET AL 2,675,747

APPARATUS FOR SEGREGATING STACKS OF
SHEET MATERIAL FROM A CONTINUOUSLY
FORMING SUPPLY OF THE MATERIAL

Filed Jan. 13, 1950

Inventors:
Charles J. Greiner
Reinhardt M. Sabee
By: Soans, Pond + Anderson
Attys.

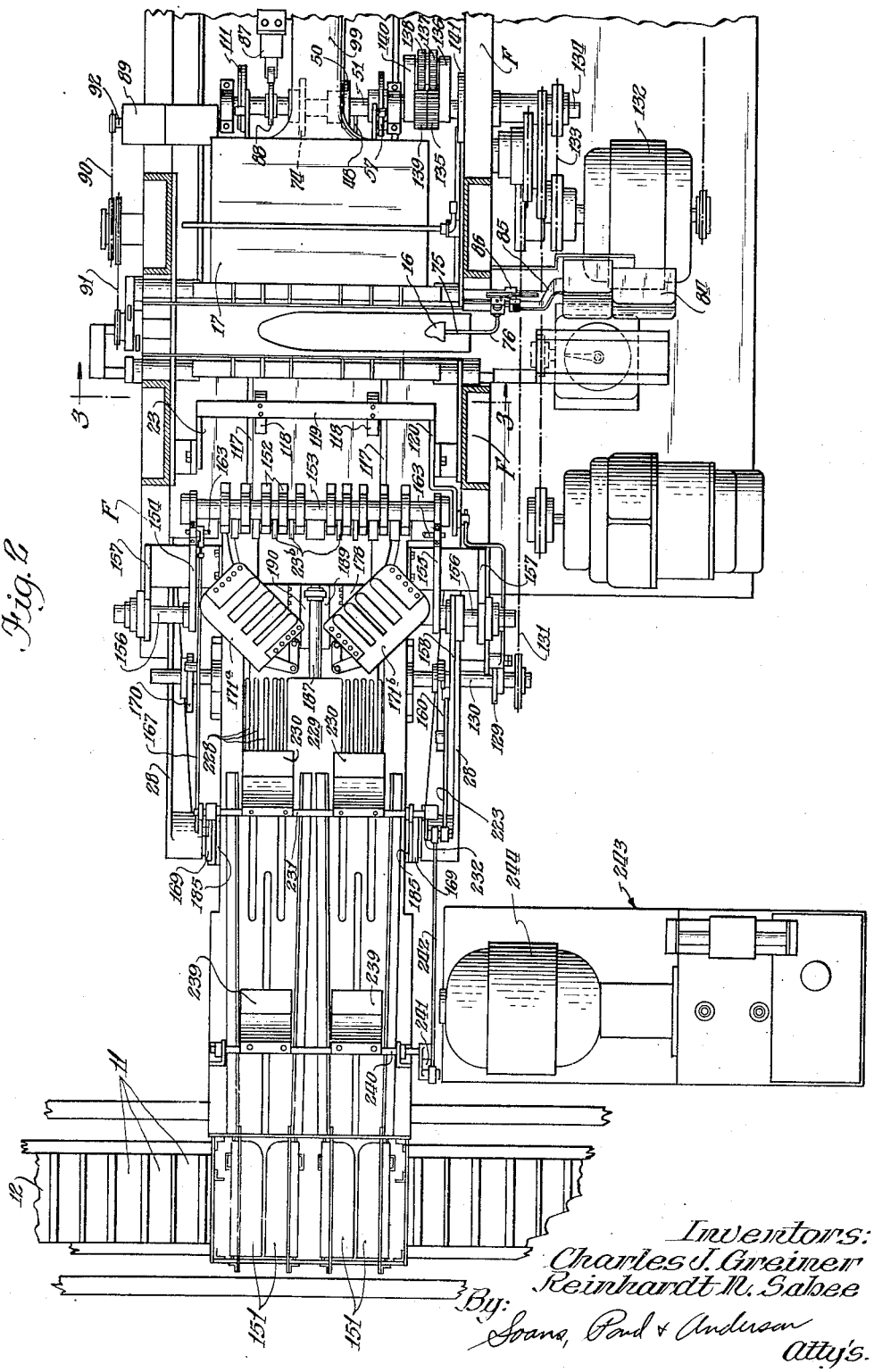

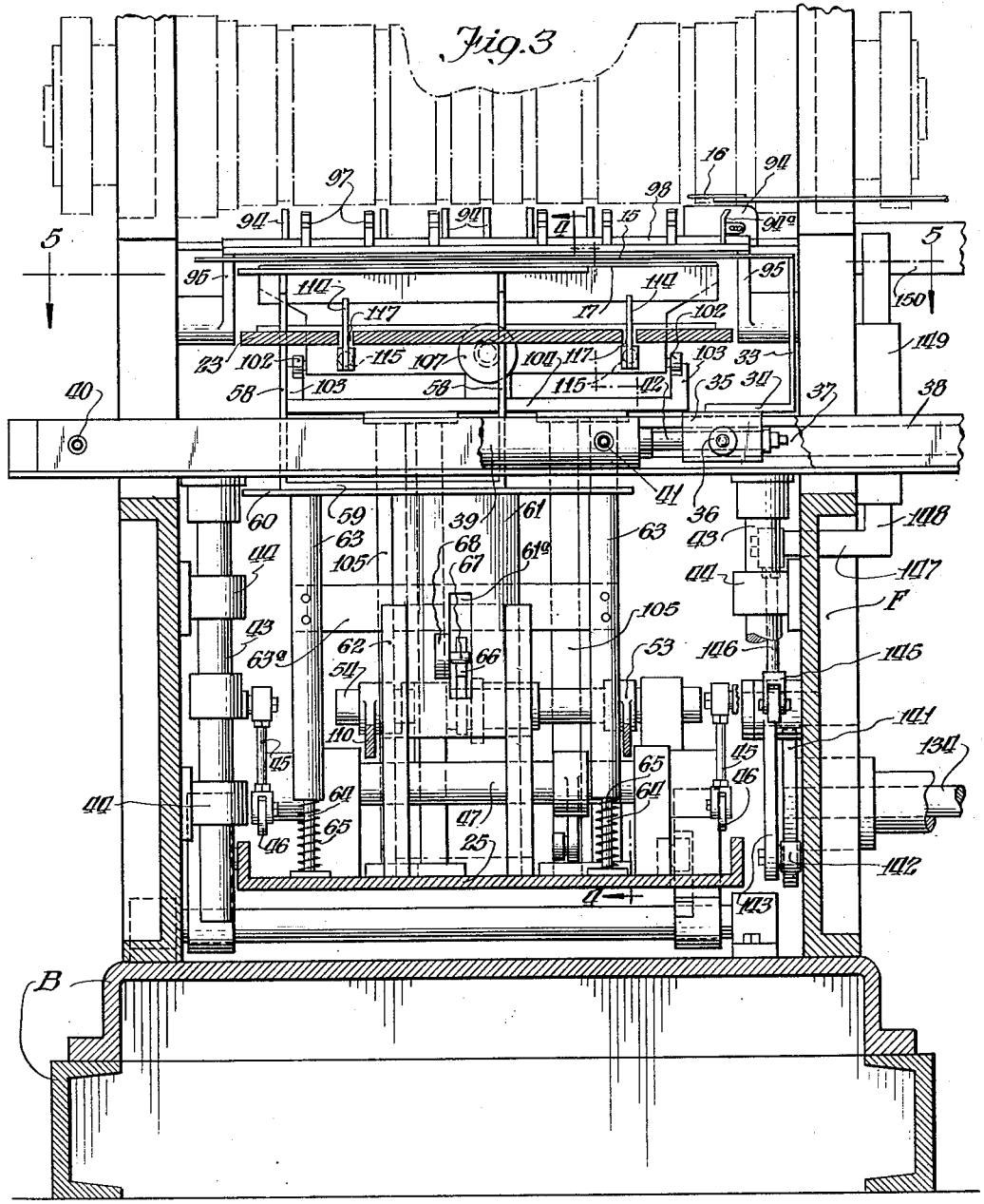

April 20, 1954
C. J. GREINER ET AL
2,675,747
APPARATUS FOR SEGREGATING STACKS OF
SHEET MATERIAL FROM A CONTINUOUSLY
FORMING SUPPLY OF THE MATERIAL
Filed Jan. 13, 1950
12 Sheets-Sheet 4
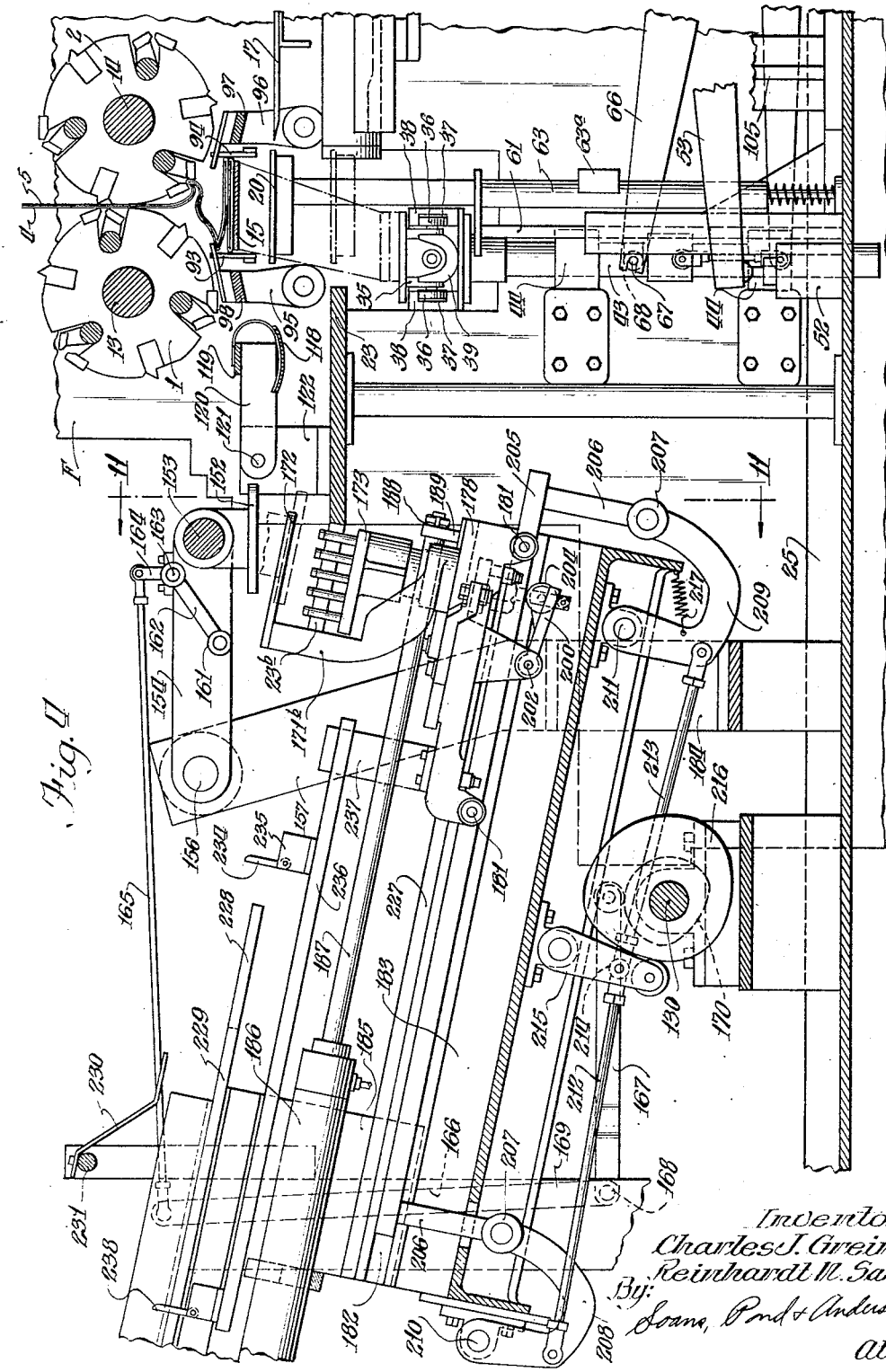
Inventors:
Charles J. Greiner
Reinhardt N. Sabee
By Soans, Pond & Anderson
Attys

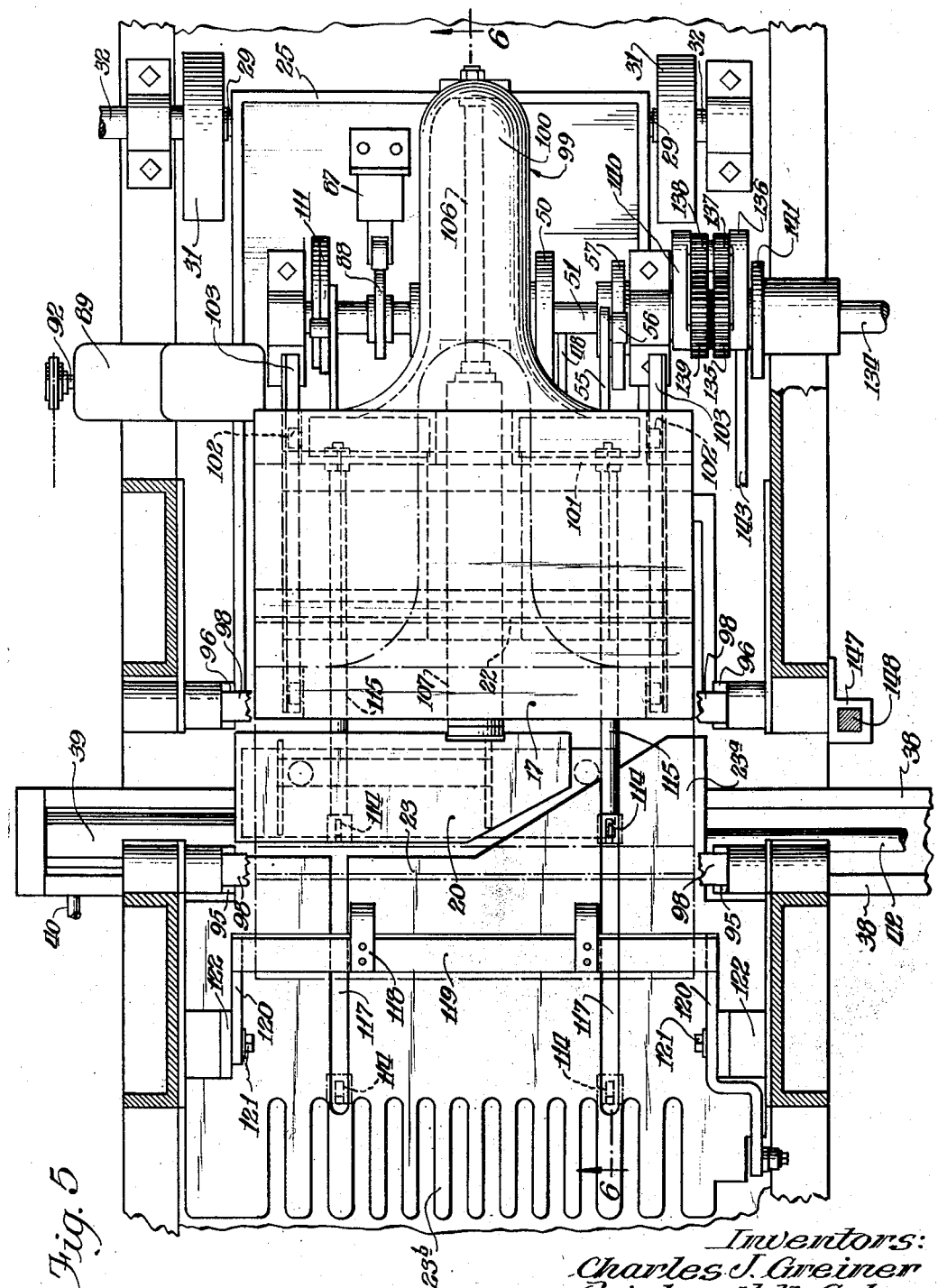

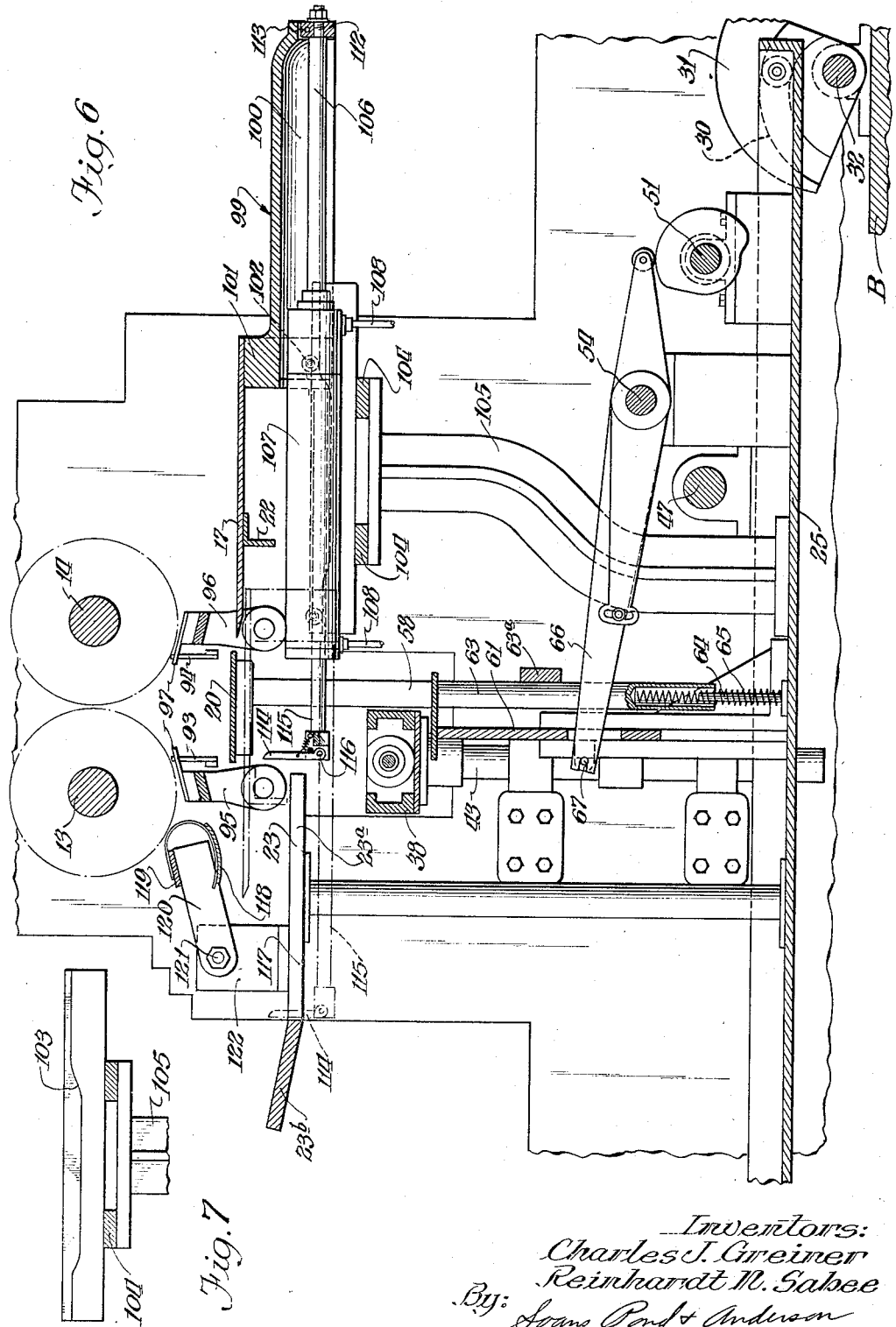

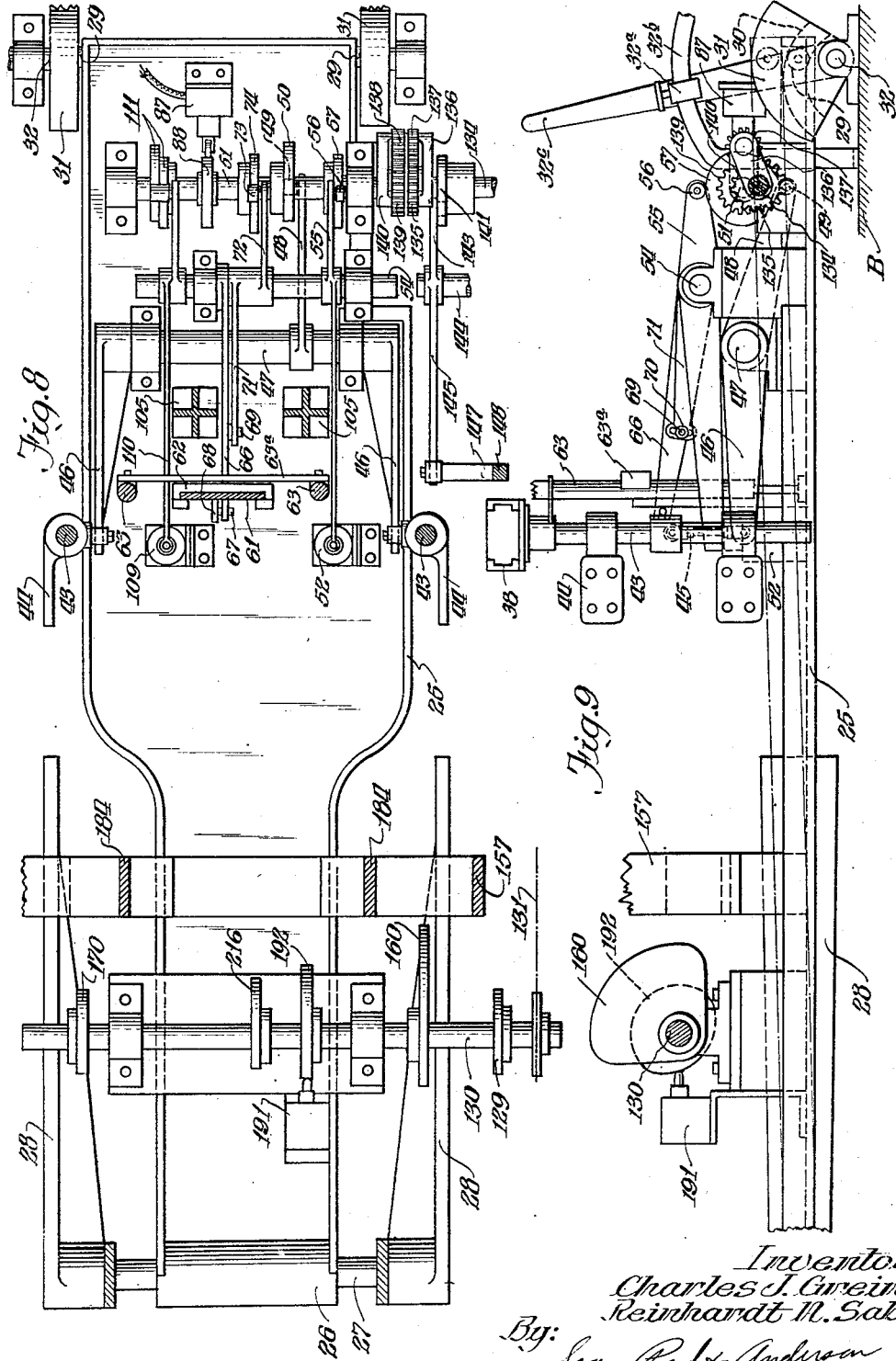

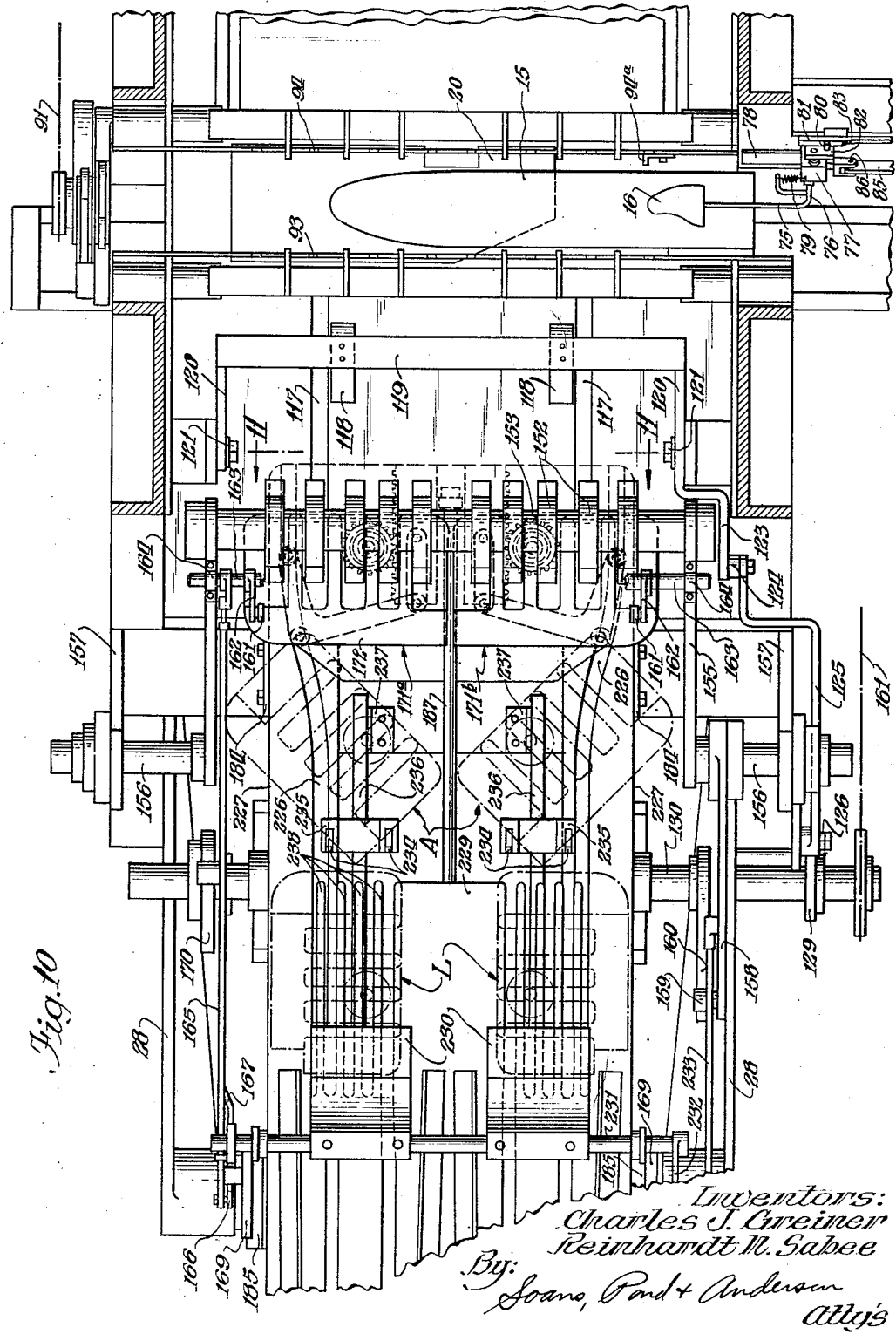

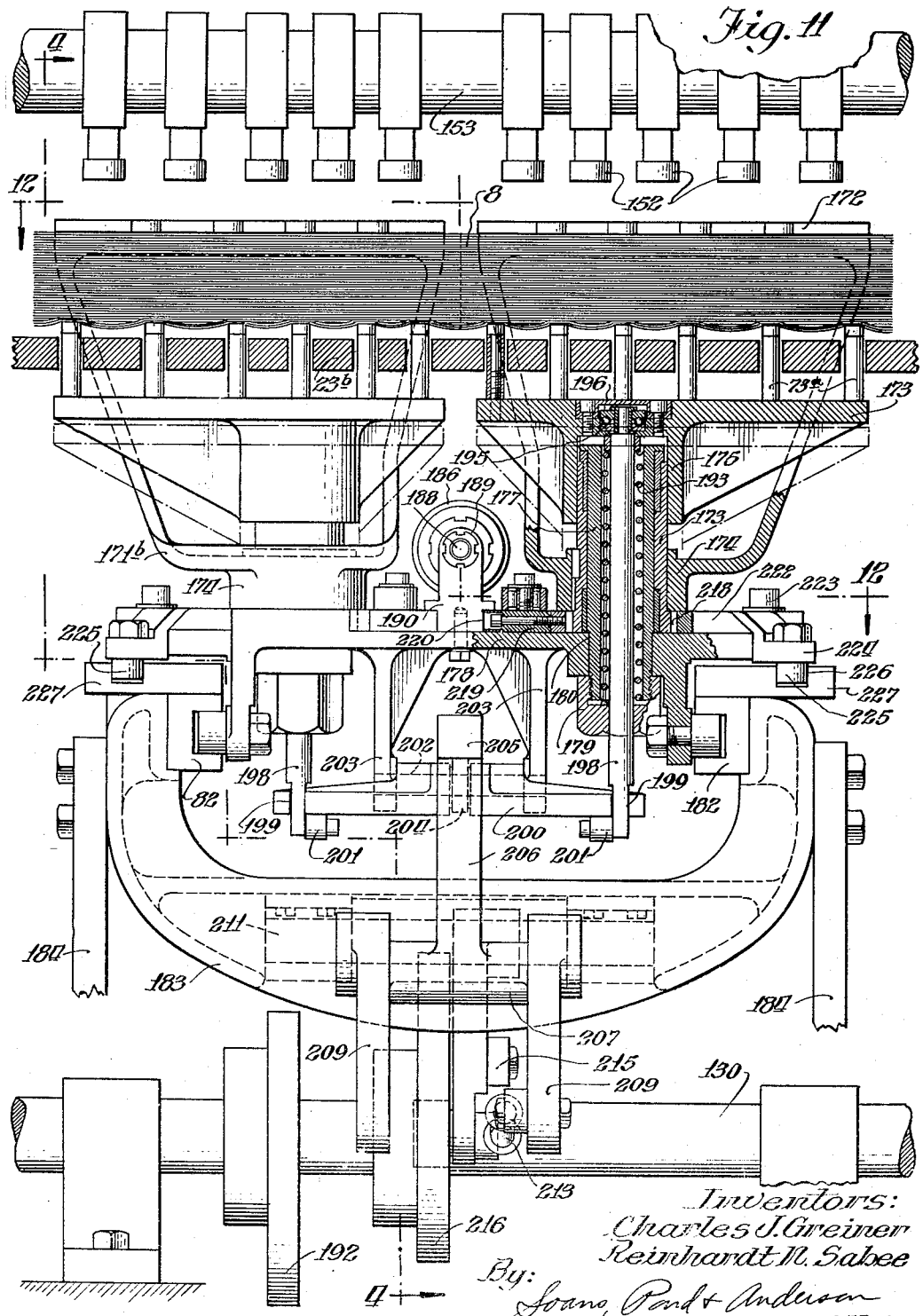

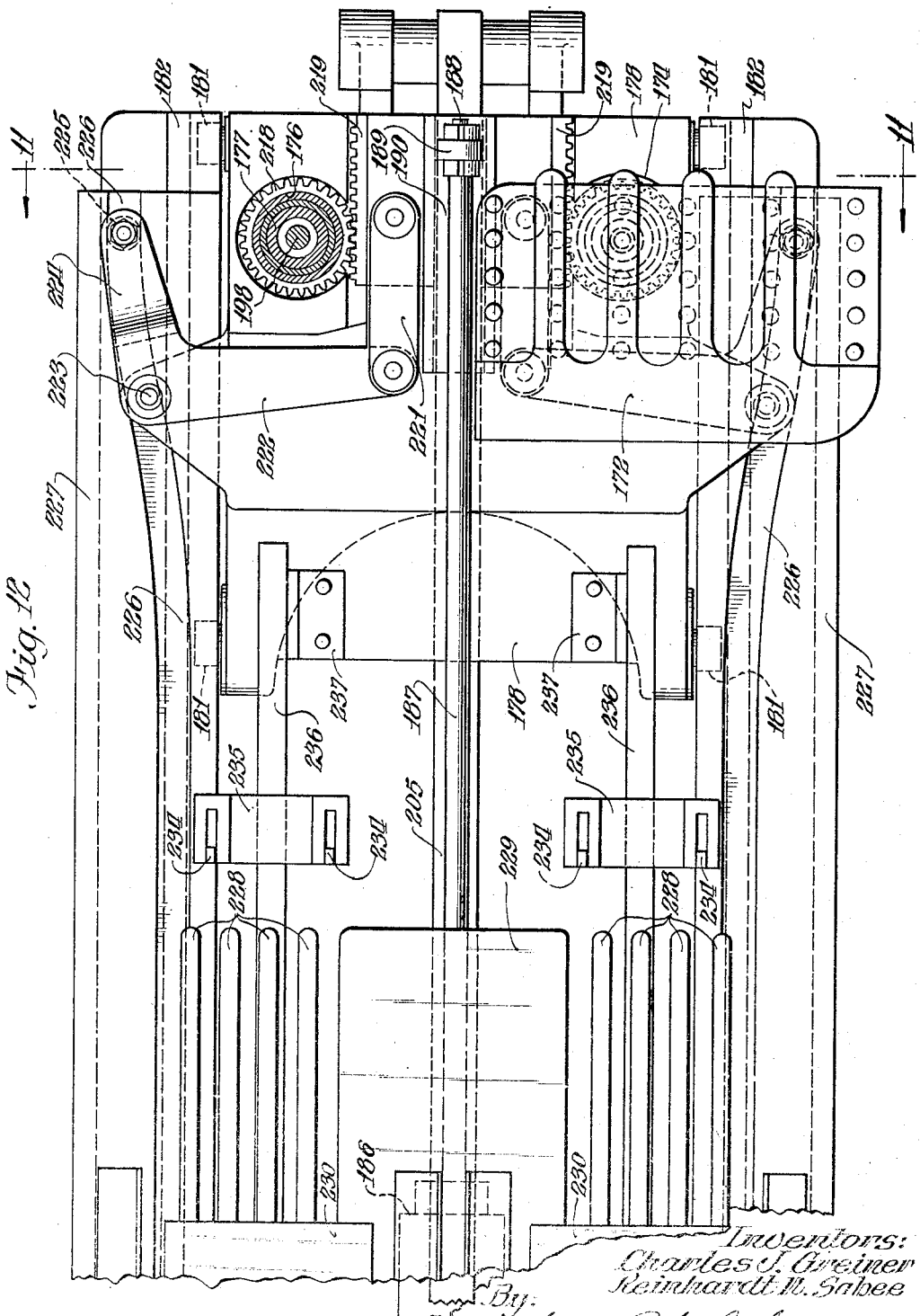

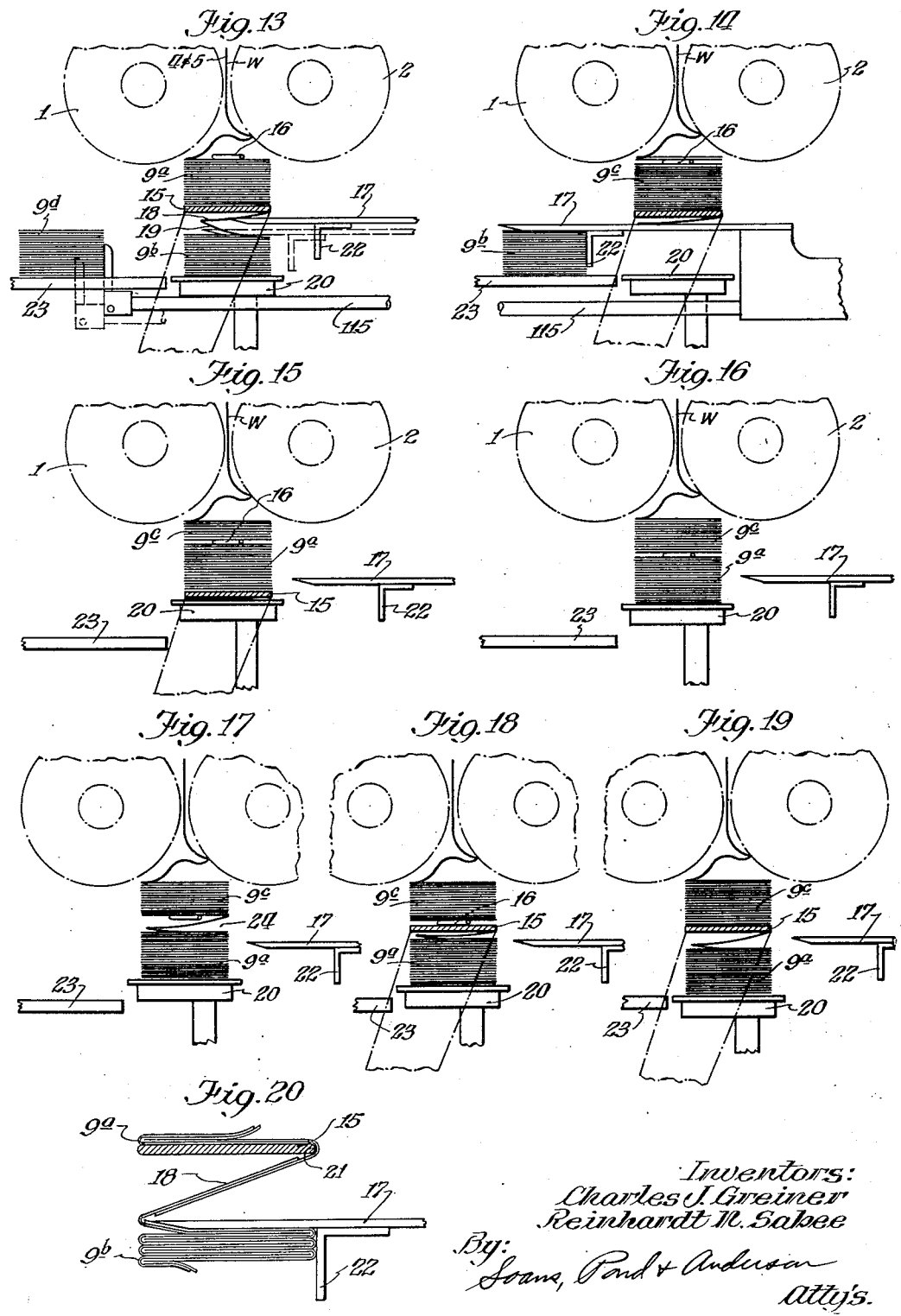

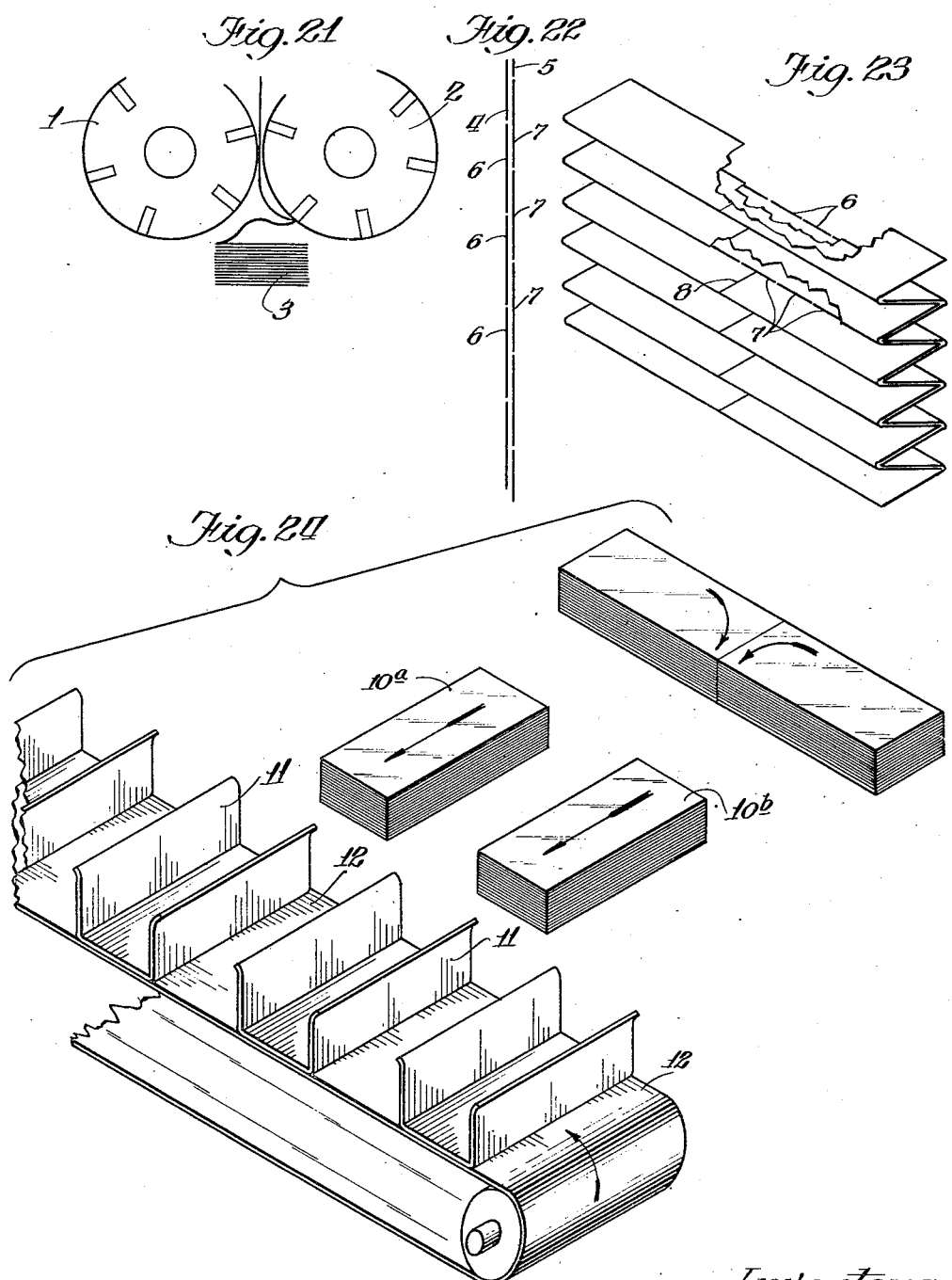

Patented Apr. 20, 1954

2,675,747

UNITED STATES PATENT OFFICE 2,675,747

APPARATUS FOR SEGREGATING STACKS OF SHEET MATERIAL FROM A CONTINUOUSLY FORMING SUPPLY OF THE MATERIAL

Charles J. Greiner, Menasha, and Reinhardt N. Sabee, Appleton, Wis., assignors to International Cellucotton Products Co., Chicago, Ill., a corporation of Delaware Application January 13, 1950, Serial No. 138,502

18 Claims. (Cl. 93—93)

This invention relates to apparatus for segregating stacks of sheet material from a continuously forming supply thereof, and in this application, the invention is explained as applied to apparatus for segregating stacks of folded and interfolded tissue paper, such as facial tissue, from a supply of such tissues during the formation of such supply by a high speed continuously operating tissue interfolding machine.

The main objects of the invention are to automatically divide sheet material which is continuously piled into a stack, into separate stacks containing a predetermined number of sheets; to provide apparatus for dividing elongated stacks of articles into a pair of shorter stacks; to provide means for turning the stacks so as to present the stacks in predetermined position for discharge from the apparatus; to provide efficient automatic mechanism for producing stacks of tissues ready for packaging in a box or other enclosure; and to provide such mechanism which will operate continuously in cycles so as to accumulate and discharge stacks of tissues from high speed, continuously operating tissue or interfolding mechanism.

Other objects and advantages of the invention will be understood by reference to the following specification and accompanying drawings (13 sheets) wherein there is described and illustrated a typical embodiment of an apparatus for attaining the abovementioned objects.

In the drawings,

Fig. 2 is a plan;

Fig. 3 is a cross section on a plane approximately represented by the line 3—3 of Fig. 2;

Fig. 4 is a longitudinal cross section approximately on the plane represented by the line 4—4 on Figs. 3 and 11;

Fig. 5 is a plan section on the line 5—5 of Fig. 3;

Fig. 6 is a longitudinal cross section on the line 6—6 of Fig. 5;

Fig. 7 is an illustration of a detail appearing also in Fig. 6;

Fig. 8 is a plan section on a plane approximately represented by the line 8—8 of Fig. 1;

Fig. 9 is a side elevation of the mechanism illustrated in Fig. 8;

Fig. 10 is a fragmentary plan corresponding to a portion of Fig. 2 but on a somewhat enlarged scale;

Fig. 11 is a vertical cross section on the line 11—11 of Figs. 4 and 10;

Fig. 12 is a plan section on the line 12—12 of Fig. 11;

Figure 1:
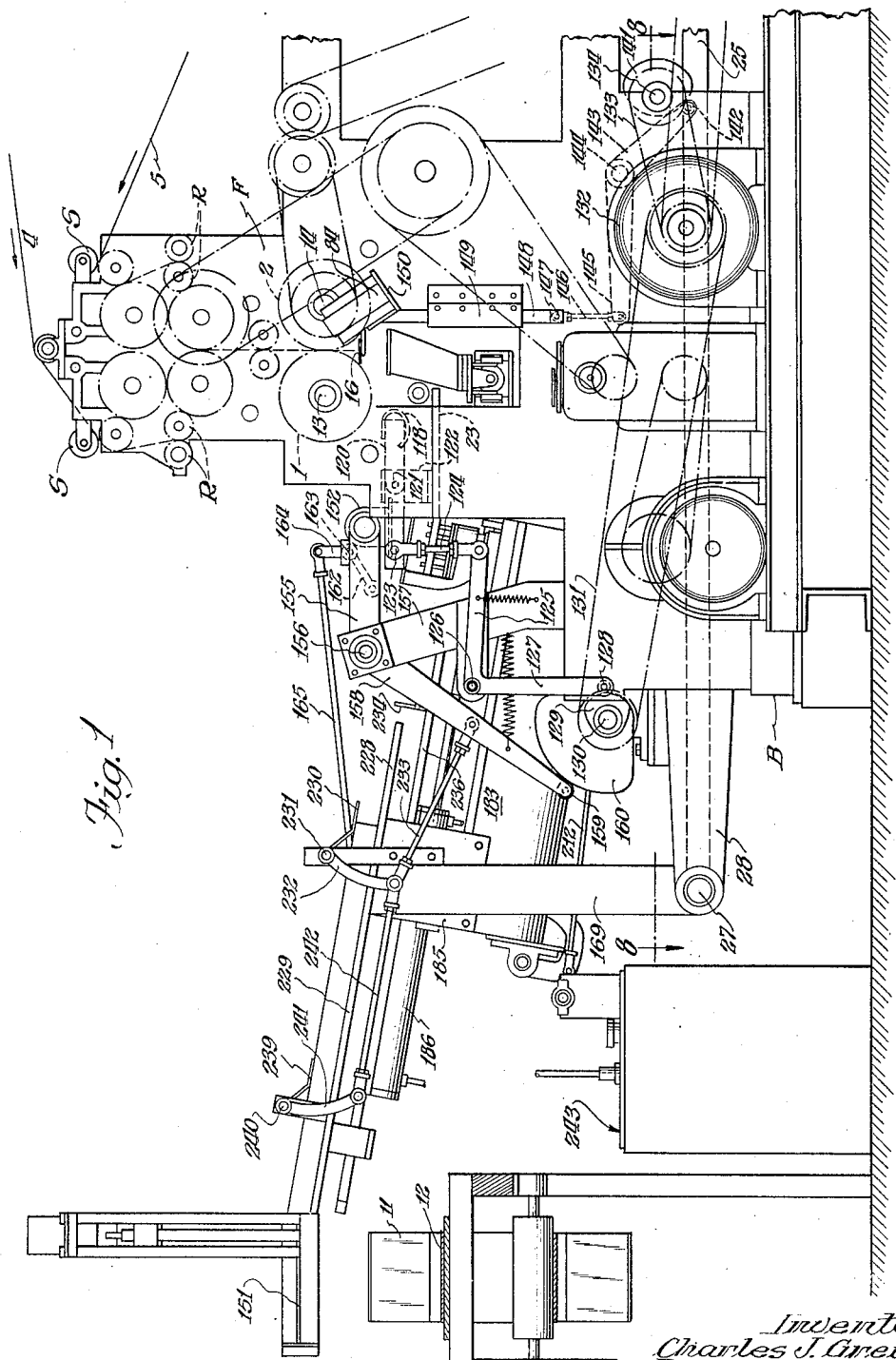
Fig. 1 is a side elevation.

Figs. 13 to 19 inclusive, are more or less diagrammatic illustrations representing various steps in the operation of the mechanism;

Fig. 20 is a more or less diagrammatic illustration of a detail of the operation of a part of the mechanism; and Figs. 21, 22, 23 and 24 are diagrammatic illustrations representing the preparation of one type of material which is made into stacks ready for packaging, and the general mode of operation of the mechanism according to the present invention.

Referring now to the drawings and, first, to Figs. 21, 22 and 23, a pair of interfolding rolls are represented at 1 and 2 which are driven continuously at high speed and which function to z-fold and interfold two webs of tissues so as to continuously add to the top of a stack 3 of folded and interfolded tissues. The interfolding rolls 1 and 2 receive two webs of tissue material such as represented at 4 and 5 in Fig. 22. These webs are slit transversely as indicated at 6 and 7, this slitting being interrupted by only slight bonds which are permitted to remain for the purpose of holding the sheet sections in continuous web form. These bonds are quite weak and are easily broken when desired, thereby facilitating separation of sections of the respective webs from the supply webs. As indicated in Fig. 22, the slits 6 in the web 4 are disposed in staggered relation to the slits 7 in the web 5, the slits 6 being located about midway between the slits 7. When these sheets are interfolded by the action of the rolls 1 and 2, the slits 7 will occur within the folds of the sections of the web 4 and, similarly, the slits 6 will occur within the folds of the sections of the web 5. This relationship is indicated in Fig. 23.

For economical operation and for certain practical reasons, it is advantageous to fold webs 4 and 5 having a width twice that of the desired width of the tissues when packaged. Accordingly, the webs are slit longitudinally so that in the interfolded condition of the webs represented in Fig. 23, there will occur a line of severance indicated at 8, which extends continuously of the lengths of the webs 4 and 5 and transversely of the folded material. The slitting 8 is continuous and is practically complete but nevertheless slightly imperfect (or predetermined small bonds may be permitted to remain) so that the web portions of opposite sides of the slitting 8 remain very weakly bonded together. The folded tissues discharged from the apparatus represented in Fig. 21, will be in the form of an elongated, double length stack 9 (Fig. 24) which is divided by the slitting 8 into two sections which may be broken from each other.

By the apparatus herein disclosed, double length stacks 9 of tissues are accumulated and discharged as rapidly as they are produced by the interfolding mechanism, the stacks being fed laterally and then broken at the transverse severance 8 into separate shorter stacks 10a and 10b, these stacks being turned 90° in the operation of breaking the stack 9 and then fed endwise as indicated by arrows on said stacks 10a and 10b in Fig. 24. The stacks are fed endwise and delivered by suitable means into pockets or carriers 11 on a conveyor 12 by which the individual stacks 10 are propelled sidewise to another station or, for example, to mechanism for inserting the same into a box.

The mechanism for folding and interfolding a pair of webs of material as represented by Figs. 21, 22 and 23, may be any suitable interfolding mechanism. One type of such mechanism is shown in U. S. Patent No. 2,468,254, De Loye, April 26, 1949. In general, such mechanism comprises interfolding rolls 1 and 2 carried by driven shafts 13 and 14 (Fig. 1) which are suitably journaled in vertically disposed side frames which extend upwardly from a suitable base. Various portions of the side frames are designated F and various portions of the base are designated B. As shown in Fig. 1, the mechanism is equipped with pairs of feed rolls R which draw the webs 4 and 5 into the machine. Slitters S are provided for cooperating with suitable anvil rolls to longitudinally slit the webs as they enter the machine so that the interfolding rolls 1 and 2 operate on longitudinally slitted webs.

The details of the interfolding mechanism are not a part of the present invention and are therefore represented more or less diagrammatically. It is sufficient for the purposes of this specification to state that these rolls function to interfold continuous longitudinally divided webs in the manner already explained.

The stack forming and discharging mechanism operates in the manner illustrated in Figs. 13 to 19 inclusive. As there shown, it is assumed that the apparatus has been in continuous operation for some time. The two webs 4 and 5 are represented in these figures by a single line W. As shown in Fig. 13, a stack 9a of folded tissue has been accumulated on a plate 15. This plate is automatically moved vertically downwardly from the position illustrated in Fig. 13 while additional tissue is folded and deposited on top of the stack 9a, this downward movement being such as to maintain the level of the top of the stack of material substantially constant with reference to the rolls 1 and 2. A counting finger or marker 16 is moved into overlying relation to the stack 9a when the required number of sheets are accumulated in the stack.

At about the time that a full stack 9a has been accumulated on the plate 15 a previously formed stack 9b on a vertically movable table or platform 20 has been lowered to the position shown in Fig. 13 so as to space said stack 9b from the stack 9a. Since the stacked material is formed from a continuous web, a fold or section 18 of the material extends diagonally between and connects said spaced stacks 9a and 9b. A fold 19 on the top of the stack 9b is also caused to curve upwardly from said stack 9b approximately as represented in said Fig. 13. A blade or plate 17 is moved edgewise under the plate 15 so as to cause the sharpened front edge of the blade to enter between said spaced stacks 9a and 9b and as the leading edge of the blade 17 approaches the far side of the stacks 9a and 9b it engages said connecting web section 18 and also moves downwardly a small distance to the position indicated in dotted lines in Fig. 13 to slightly compress the stack 9b. The inward and downward movement of the sharp edged blade 17 in the manner indicated, tensions said connecting web section 18 and thereby effectively accomplishes breakage of the bonds which occur as shown in Fig. 20 at the leading edge of said plate 17 and at the edge 21 of the supporting plate 15. The stack 9b is thereby separated from the overlying, later formed stack 9a.

The separating blade 17 carries a depending pusher 22 on its lower side which comes into engagement with the stack 9b so that upon continuation of the movement of the member 17 beyond the stack 9a as represented in Fig. 14, the stack 9b will be advanced to a receiving table structure 23.

During all of these operations the folding or interfolding rolls 1 and 2 are continuing to deposit folded tissue material on top of the stack and above the counting finger 16.

From the position illustrated in Fig. 14, the separating blade 17 with its stack pusher 22 is retracted to its starting position which is illustrated in Fig. 15. After the member 17 has been so retracted, the platform or table member 20 is automatically elevated to a position closely adjacent the bottom of the supporting plate 15 as shown in Fig. 15, whereupon the plate 15 is withdrawn in an endwise direction leaving the stack 9a on the table 20 as shown in Fig. 16. This plate 15 is a thin and highly polished plate and it preferably extends through the entire length of the interfolded tissue stacks. A suitable stop is provided to prevent endwise movement of the stack with the plate 15 and such stack movement is further avoided by providing the plate with smooth highly polished surfaces and by the inertia of the tissue material overlying said plate 15.

As interfolding of the tissue webs continues, the platform 20 and the counting finger 16 are automatically moved downwardly. The counting finger moves downwardly in conformity to the rate at which the thickness of the overlying stack 9c is built up and the platform 20, at the proper time, is caused to move downwardly at a somewhat greater speed so that a gap 24 will be developed between the stacks 9a and 9c as represented in Fig. 17. When the gap 24 is wide enough, the previously withdrawn plate 15 is moved endwise between the stacks 9a and 9c immediately under finger 16 as represented in Fig. 18. This plate 15 has its front end suitably shaped to enable it to more or less plow its way between the stacks 9a and 9c, and the counting finger 16 is then withdrawn and moved upwardly so as to be in position for reinsertion above the next new stack 9c when it reaches full thickness so as to occupy the place of the starting stack 9a as shown in Fig. 13. The counting finger 16 is of only short length and extends into the stack for only a portion of the length of a single stack whereas the plate 15 is of full length and extends through the entire length of the double stack.

The table 20 continues its downward movement until its top surface is again coplanar with the top of the table 23 as represented in Fig. 19, whereupon the parting blade 17 is again actuated to start another cycle of operation. A stack 9d represented in Fig. 13 in position on the table 23 will, meanwhile, have been picked up and advanced by mechanism which breaks the double length stack into two sections and turns the sections to the endwise position represented in Fig. 24.

To attain the most efficient operation of the interfolding mechanism, provision should be made to permit the top of the accumulating tissue stack to be adjusted toward and from the interfolding rolls without disturbing the operative relationship existing between said plate, blade, and tables. Unavoidable variations in the thickness, moisture content and other characteristics of the tissue material, and variations in atmospheric humidity, and perhaps other causes, affect the functioning of the high speed interfolding mechanism. Adverse effects of variations in these and other elements can often be counteracted by adjusting the top level of the accumulating stack toward or from the interfolding rolls. To facilitate such adjustment while maintaining a fixed relationship of the parts of the stack segregating mechanism, said mechanism is supported (see Figs. 1, 2, 8 and 9) on an elongated base shelf 25 which is pivotally mounted at one end as indicated at 26, on a shaft 27 which is supported in brackets 28, the latter being rigidly attached to the side frame members F of the apparatus. At its other end, the base shelf 25 is vertically adjustably supported by means of rollers 29 secured to said base shelf and projecting into cam grooves 30 provided in a pair of segments 31, 31 carried by a shaft 32 which is suitably journaled in bearings mounted on the fixed base B of the apparatus. These segments 31 are normally locked in fixed position by any suitable clamp means 32a which acts on a fixed quadrant 32b, said clamping device being carried by a hand adjusting lever 32c which is attached to said shaft 32. The cam groove 30 is so formed that by rocking the segments 31 the adjacent end of the base shelf will be adjusted up or down thereby correspondingly adjusting other elements of mechanism which are mounted on said base shelf. Because of the long lever-arm length of the pivoted base shelf, and the relatively small throw of the cam grooves 30, very accurate adjustment of the top level of the accumulating tissue stack can be very easily made. This adjusting mechanism may be automatically actuated as an incident to changes in the level of the top of the stack to which the material is delivered or as an incident to changes in the upward pressure of the top of the stack against a feeler member. Details of such automatic mechanism are not necessary to the operation of the described mechanism and are therefore not shown.

Referring now to Fig. 3, the receiving plate 15 is supported by means of an end bracket having a vertical leg 33 and a horizontal leg 34 which is secured to a slide block 35. This slide block 35 has a pair of rollers 36 extending from its opposite sides as shown in Fig. 5, and these rollers are arranged to travel in track grooves 37 provided in the side members 38, 38 of an elongated housing structure within which there is mounted a hydraulic motor 39 (Fig. 3). This hydraulic motor 39 embodies a cylinder having suitable pressure fluid connections 40 and 41 adjacent its opposite ends and a piston rod 42 which is adapted to be moved inwardly and outwardly of the cylinder, said piston rod having a suitable piston attached thereto within the cylinder. The slide block 35 which carries the supporting plate 15 is mounted on the outer end of said piston rod 42 so that said slide block and supporting plate 15 are movable in an endwise direction incident to the delivery of pressure fluid into the respective ends of the cylinder 39 and relief of fluid from the respective opposite ends thereof.

The cylinder housing including said side members 38 is vertically adjustably supported on a pair of rods 43, 43 (Figs. 3 and 4) which are vertically slidable in suitable guide members 44. The guide members 44 are fixedly attached to portions of the side frame structure F which are mounted on the stationary base structure B. The vertically slidably mounted posts 43 are connected by means of links 45 to the free ends of arms 46 (see Figs. 8 and 9) which are secured at their other ends to a cross shaft 47 which is journaled in suitable bearing brackets mounted on the adjustable shelf 25. Another arm 48 is secured to said shaft 47 and has its free end provided with a cam following roller 49 which operatively engages the cam surface of a rotary cam 50 carried by a cam shaft 51 which is suitably journaled on said bottom shelf 25. The cam 50 is shaped to cause the posts 43 and the structure supported thereon to move up and down as required to carry out the operations above described in connection with Figs. 13 to 20 inclusive. The cam shaft 51 is continuously rotated by driving means which will presently be explained.

Reciprocation of the piston 42, and hence of the tissue receiving plate 15 is controlled by a four-way valve 52 (Fig. 8) which is mounted on the shelf 25 and connected by suitable conduits to the cylinder 39. The valve 52 is so arranged and so connected to the cylinder 39 and to a source of pressure fluid that in one position of the core of the valve, fluid under pressure will be delivered through the port 40 into one end of the cylinder 39, thereby to effect withdrawal of the receiving plate 15 from the stack of tissues. In the other position of adjustments of the core of the valve 52 pressure fluid will be admitted through the port 41 into the other end of the cylinder 39 thereby to effect endwise movement of the receiving plate 15 into operative position in the tissue stack. In these two positions of adjustment of the valve 52, when pressure fluid is introduced into one end of the cylinder, the other end is connected through the valve to permit escape of the fluid from the cylinder and return thereof to a receptacle from which it is pumped and delivered under pressure to the pressure side of the cylinder. The details of the valve 52 are well known and are not for that reason herein illustrated.

The valve 52 is actuated by the free end of a lever arm 53 which is rockably mounted on a shaft 54 (Figs. 8 and 9) which is suitably supported on the shelf 25. Said lever arm 53 is extended as indicated at 55 beyond the shaft 54 and has its other end provided with a roller 56 which engages a rotating cam 57 on said cam shaft 51. The cam 57 is, of course, so formed as to actuate the valve 52 to control the delivery and relief of pressure fluid to and from the cylinder 39 as required for the described operational movements of the receiving plate 15.

It will be observed from the foregoing explanation with reference to the mounting of the plate 15 that it is automatically moved up and down according to a predetermined pattern determined by the shape of the cam 50, and that it is moved endwise in and out with reference to the stack of tissues according to a predetermined pattern, as determined by the shape of the cam 57. Also in the event that the base shelf 25 is adjusted up or down, the pivot shaft 47, the lever arms 48 and 46, the posts 43 and parts supported thereby will be correspondingly adjusted.

The elevator plate 20 is mounted on the upper ends of the side arms 58, 58 of a U-shaped bracket, the bottom member 59 of which bracket is secured to a supporting plate 60. This supporting plate 60 is mounted on a plate-like post 61 which is vertically slidably mounted in a guide structure 62 (see also Fig. 8). The plate post 61 is disposed approximately centrally of the table 60 and suitable hollow posts 63, 63 are secured to and depend from opposite end portions of said table 60 and are telescoped over upstanding posts 64, 64 which are mounted on the pivoted base shelf 25. Suitable coil springs 65 disposed around the posts 64 and between base flanges on the lower ends thereof and the lower ends of said tubular post 63 serve to resiliently counter-balance the weight of the supporting plate 20, the U-shaped bracket part by which said plate is mounted on the table 60, and said table 60 and other parts connected thereto. The tubular posts 63 are preferably rigidly interconnected by a cross bar 63a (Fig. 3).

Vertical movement is imparted to the plate post 61 and the parts connected thereto by means of a lever arm 66 (see Figs. 8 and 9), one end of which is rotatably mounted on the cross shaft 54 and the free end of which is forked and straddles a pin 67 projecting from a bracket or lug 68 rigid with the slide plate 61. As shown, the plate 61 is apertured as indicated at 61a (Fig. 3) to permit the lever arm 66 to pass therethrough into engagement with the pin 67.

The lever arm 66 is adjustably connected by a clamping bolt 69 to the slotted end 70 of a lever arm 71 which is rockably mounted on the said shaft 54. Said lever arm 71 has integrally connected thereto through a suitable hub, another arm 72 which has its free end provided with a cam following roller 73 which operatively engages the peripheral cam surface of a rotating cam 74 carried by the cam shaft 51. The clamping bolt and slot connection between the arms 71 and 66 permit a desirable amount of adjustment of the vertical position of the supporting plate 20 for any given position of the cam 74. The supporting plate 20 is moved up and down in a continuous cycle of movements by the action of the rotating cam 74 and this cam is suitably shaped to cause vertical movement, first, at the same speed downwardly as the overlying plate 15, later at an accelerated rate of speed, and then to return the plate to its elevated position, all in accordance with the foregoing explanation of operation in connection with Figs. 13 to 19 inclusive. Because of the counter-balanced arrangement of the supporting table 60, there is no heavy load placed upon the lever arm system 66, 71 and 72 and the cam 74 is easily capable of imparting smooth, vibrationless movement to said elevator plate 20 according to the pattern determined by said cam 74.

The vertically movable elevator plate 20 is of shorter length than the length of a double or twin stack of tissues which approximately corresponds in length to the width of the table 23 (see Fig. 3). As shown in Figs. 3 and 5, the elevator or platform 20 terminates short of the end of the tissue stack into which the plate 15 enters. By this arrangement, the end portion of the stack 9a (Figs. 17 and 18) over which the plate 15 enters the stack is permitted to sag downwardly from the bottom face of the overlying counting-finger-supported stack 9c thereby to more or less open the end of the stack to further facilitate entrance of the receiving plate 15 into said stack. The receiving table 23 is extended as shown at 23a (Fig. 5) to underly said sagging end portion of the stack so as to receive said end portion when said platform 20 is lowered to coplanar relation to said table 23.

The counting finger 16 is a relatively small, more or less triangular, plate element as best shown in Figs. 2 and 10, and it is carried by one end of a rod 75 which has an end portion 76 bent to a perpendicular relationship to the finger-carrying portion 75. The laterally extending portion 76 of the rod is pivoted in a block member 77 which is horizontally slidably mounted on a suitable track 78. Suitable spring means 79 normally tends to rock said arm 75 and counting finger 16 in an upward direction but such movement is limited by the engagement of a pin 80 with a cam track 81 which is fixedly mounted adjacent the path of reciprocation of said block 77. The pin 80 projects from an arm 82 which is secured to an extension of the rod part 76 through the block 77. A dip 83 in the cam track 81 permits the spring to effect upward rocking of said finger 16 almost immediately upon starting of the retractive (withdrawal) movement of the finger so that the finger will move outwardly without any significant drag on the stacked material.

The finger 16 is reciprocated in and out by means of a so-called recipromotor which is an electric solenoid device indicated at 84 (Fig. 2). Said solenoid device acts on an armature 85 which is pivotally connected as shown at 86 to the slide block 77. The recipromotor embodies oppositely acting coils which respectively cause the armature to move in an out to impart corresponding in and out movement to the counting finger 16. Outward movement or withdrawal of the counting finger is initiated by the closing of an electric switch 87 (Figs. 2 and 8), this switch being closed by a cam 88 on the cam shaft 51. The switch 87 is held closed for only a moment or two which is sufficient to cause the counting finger to be retracted. The switch 87 then opens leaving the counting finger in its retracted position. Inward movement of this counting finger is effected by closing another switch 89 (Fig. 2), this switch being controlled by suitable chain drive connections indicated at 90 and 91, to one of the interfolding rolls whereby the rotating member 92 of said switch 89 will be rotated in exact predetermined relationship to the turns of the interfolding rolls. Hence, the switch 89 will be closed once for every predetermined number of turns of the interfolding roll; that is to say, once for each predetermined number of tissues folded by the interfolding mechanism. This switch 89, when closed, energizes the reciprocomotor 84 so as to cause insertion of the counting finger when the required number of folded sheets have been accumulated in a stack. Accurate sheet count in the stacks is thereby attained.

It may be observed that withdrawal of the counting finger occurs as represented in Figs. 17, 18 and 19, sometime before a full stack of folded sheets is accumulated above the supporting plate 15 so that return movement of the counting finger must be delayed. This delay is effected by the control switch 89.

The function of this switch 89 could be performed by another switch similar to the switch 87 controlled by a cam on the cam shaft 51 but it would be much more difficult to insure accurate timing of the inward movement of the counting finger with reference to the number of sheets folded and accumulated in a stack. The arrangement shown is connected directly to the interfolding mechanism proper and provides a relatively simple and very accurate means for governing the action of the counting finger directly by the number of folded sheets turned out by the interfolding mechanism.

The recipromotor 84 and counting finger 16 are also automatically lowered in predetermined relation to the accumulation of folded tissues over the finger and elevated to starting position by cam and lever mechanism which will hereinafter be described.

As indicated in Fig. 4, the interfolded sheets are delivered to the receiving plate 15 between the vertically disposed guides 93 and 94 and between opposite rock arms 95 and 96. The rock arms 95 and 96 and the guides 93 and 94 are parts of the interfolding mechanism proper. The guides serve, of course, to position the stack on the plate 15 and to hold the stack against forward or rearward displacement while the rock arms 95 and 96 are provided at their upper ends with projecting fingers 97 which are alternately rocked into overlapping relationship to the front and rear margins of the stack of sheets. These fingers 97 are, in effect, packing fingers which press the stack of sheets downwardly into a compact stack on the plate 15. One or more stops such as indicated at 94a (Figs. 3 and 10) are adjustably mounted on certain of said guides 93 and/or 94 in position to engage the end of the stack of material deposited between said guides. Such stops serve to prevent the stacks from moving endwise with the plate 15 when this plate is withdrawn from under the successive stacks.

As shown in Fig. 4, there are a pair of rock arms 95 (and 96) rockably mounted at their lower ends in the side frame structure F, these arms having their upper ends interconnected by a bar 98 which supports the series of the fingers 97. The connecting cross bar 98 is located at such an elevation relative to the receiving table 23 that when the stack of tissues is fed from the table 20 to the table 23, said stack will pass under the cross bar 98.

The parting blade 17 is secured at its outer end to a member 99. This member 99 is of more or less T shape (see Figs. 5 and 6) having a hollow stem portion 100 and a crosshead 101, the blade 17 being secured to said crosshead 101. At the ends of the crosshead portion 101, there are provided a pair of rollers 102, 102 (see also Fig. 3) which ride on tracks 103, 103, the latter being stationarily mounted on a pair of crossbars 104 which are carried by the upper ends of a pair of posts or brackets 105 which are, in turn, mounted on the pivoted base shelf 25. The free end of the hollow stem part 101 of said member 99 is connected to the free or outer end of a piston rod 106 which projects out of one end of a hydraulic cylinder 107 which has its opposite ends connected by suitable conduits such as indicated at 108, to a control valve (Fig. 8).

The control valve 109 is controlled by a rocking lever 110 and a cam 111 on the cam shaft 51 in about the same manner that the valve 52 is controlled as hereinbefore explained. The valve 109 is similar to the valve 52 and is such that it permits pressure fluid to be delivered selectively into the opposite ends of the cylinder 107 while relieving fluid from the opposite end thereof. The cam 111 is, of course, so formed as to cause delivery of pressure fluid into the opposite ends of the cylinder 107 to cause the piston rod 106 to transmit reciprocating movement to the member 99 and the parting plate 17 as required for the performance of the functions of the parting plate 17 as above explained, in connection with Figs. 13 to 19 inclusive.

It will be seen that when the parting plate 17 is advanced from its starting position as shown in Figs. 6 and 19, the rollers 102 will ride on the tracks 103. These tracks have a dip therein as shown in Figs. 6 and 7, intermediate their ends so that after the leading edge of the plate 17 has been advanced about half-way through the transverse width of the tissue stack as shown in full lines in Fig. 13, the rollers 102 will move downwardly into the recessed portion of the tracks thereby causing the leading end portion of the plate 17 to rock downwardly to a lower position as represented in dotted lines in Fig. 13. This action permits the plate 17 to be advanced over a portion of the width of the underlying stack of tissues free of contact therewith even though the height of the stack may vary somewhat due usually to variations in the characteristics of the tissue material. It has been found that after a sufficient area of the stack is engaged by the under surface of the plate 17 its further transverse movement may be effected without any tendency to shift or distort the stack before it is engaged by the pusher 22. This downward movement of the plate 17 effects slight compression of the underlying stack of tissues whereby the stack is firmed up to a slight and desirable extent.

When the stack 9b approaches its delivered position as shown in Fig. 14, the blade 17 is again elevated to free the plate 17 from the stack so that the initial portion of the return movement of the plate 17 is effected substantially free of or with only slight contact with the top of the stack such as 9b which has just been advanced to the receiving table 23.

To permit the plate 17 and mounting member 99 to rock as already explained, the connection of the member 99 to the piston rod 106 is effected through the agency of a block 112 (Fig. 6) which is fixed on the end of the piston rod and which fits in a slot in the end portion of said stem 100 and is pivoted thereto as indicated at 113. The member 99 and plate 17 rock up and down on the pivot 113 so as to avoid any shifting or distortion of the piston rod 106.

For advancing the stack 9d of tissues from the position thereof on the table 23 as shown in Fig. 13, when the stack 9b is to be delivered to said table, there is provided in association with the parting blade structure 17 a pair of feed fingers 114, 114 (see Figs. 5, 6, 3 and 13), these fingers being carried by the leading ends of rods 115 which are anchored to the crosshead portion 101 of the member 99. The fingers 114 are pivoted as indicated at 116 in blocks or heads fastened on the free end portions of the rods 115, the arrangement being such that on forward or feeding movement of the fingers 114 from the full line position shown in Fig. 6 to the advanced dotted line position shown therein, said fingers are supported against rearward rocking movement.

However, upon return movement of the rods 115 and said fingers 114, said fingers may rock forwardly so as to pass under the stack 9b (Fig. 14) of tissues which will have been delivered to the table 23 behind the said fingers. The table 23 is slotted as indicated at 117 to permit the described travel of the feeding fingers 114. The fingers 114 and rods 115 rock up and down with the parting plate, this being without objection inasmuch as the stack of tissues will be effectively advanced even though the fingers 114 engage only a portion of the vertical depth of the stack.

When the feed fingers 114 and the plate 17 reach their most advanced position as represented in dotted lines in Fig. 6, they will have been elevated from their lowermost position by the forward lobe or rise of the cam track 103. Most of the pressure of the plate 114 on the tissue stack underlying the plate portion in front of the pusher 22 will be relieved by said upward movement of the plate as it approaches its advanced position. However, tissue such as employed in making facial tissue, when stacked, produces a resiliently compressible stack and the stack has a tendency to expand so as to maintain light contact with the forward portion of said plate 17 even though it is elevated.

To make sure that the tissue stack will not be pulled or distorted rearwardly as an incident to retraction of the plate 17, there is provided a pair of stack compression members or hold-down shoes 118 in the form of spring shoes (Figs. 5 and 6). These spring shoes preferably have a suitable friction lining on their lower legs for engagement with the tissue stack and they are mounted on a cross bar 119 which is carried by the free ends of a pair of arms 120 which are pivoted as indicated at 121 on suitable brackets 122 mounted on the opposite side portions of the table 23.

The hold-down shoes 118 are rocked downwardly by a cam and linkage arrangement as best shown in Figs. 1 and 10. As there shown, one of the rock arms 120 is extended beyond its pivot 121 and connected at its free ends as indicated at 123 to the upper end of an adjustable length link 124, the lower end of which is connected to the free end of the arm 125 of a bell crank which is pivoted as indicated at 126 on a suitable, fixed bracket arm carried by a part of the main frame structure. The other arm 127 of said bell crank has its free end provided with a roller 128 which engages a rotating cam 129 carried by a cross shaft 130 which is journaled in suitable bearings mounted on portions of the side frames F or brackets attached thereto. The cam 129 is so formed and rotated that the spring shoes 118 will, in properly synchronized relation to the movement of the plate 17, periodically be lowered into engagement with tissue stacks to slightly compress the same, thereby to prevent their following the parting plate 17 when the latter starts its return movement.

The cam shaft 130 is suitably driven, for example, by a chain drive 131 from an electric motor 132. This motor 132 also operates through a chain drive indicated at 133 (Figs. 1 and 2) to drive a shaft 134 which is journaled in the stationary frame strucure F. Said shaft 134 is disposed approximately in the vertical plane of the cam shaft 51 and is connected thereto (see Fig. 5) through the agency of a sun gear 135, and arm 136, a double sun pinion gear 137, 138, a sun gear 139, and an arm 140.

The sun gears 135 and 139 are secured rigidly to the shafts 134 and 51 respectively, but they are separate from each other and do not occupy a co-axial relationship, the axis of the drive shaft 134 being lower than the axis of the cam shaft 51. The arms 136 and 140 are respectively journaled on the shafts 134 and 51 and the pinion gear 137, 138 is rotatably mounted on a shaft journaled in the outer end portions of said arm 136 and 140. The sun gears 137 and 138 are integrally or rigidly interconnected. This arrangement maintains a constant driving connection between the shafts 134 and 51 while permitting the shaft 51, to move up or down relative to the shaft 134 as an incident to vertical adjustment of the pivoted bottom shelf 25 on which said cam shaft 51 is journalled. The shaft 134 is journaled with its axis below the lowest position which can be assumed by the cam shaft 51 so that these shafts can never assume a co-axial relationship. Under these circumstances, the arm 136 will incline upwardly from the shaft 134 whereas the arm 140 will incline downwardly from the shaft 51 so that they lock one another against rotation about the shafts 134 and 51 respectively, the pinion gears 137, 138 being thereby, in effect, held against rotation about the axis of said shafts 134 and 51. Hence, rotation of the gear 135 will be transmitted through the pinion gears 137, 138 to the gear 139 and shaft 51 in various positions of vertical adjustment of the shaft 51 relative to the drive shaft 134.

Vertical movement of the counting finger is controlled by a rotary cam 141 (Fig. 1) which is secured to the drive shaft 134 and this cam acts on a roller 142 carried by the free end of an arm 143 of a bell crank which is pivoted as indicated at 144, on the main frame structure (see also Figs. 3, 5 and 8). The other arm 145 (Fig. 1) of said bell crank is connected by means of a suitable link 146 to the lower inwardly offset end portion 147 (Fig. 3) of a square bar 148 which is vertically slidably and non-rotatably mounted in a guide 149 on the outside of one of the side frames F.

An angle iron shelf or platform structure 150 (Fig. 1) is rigidly attached to the upper end of said bar 148 and said platform 150 supports the reciprometer 84, and parts actuated thereby including said counting finger 16, for vertical movement as required for the functioning of the counting finger as already explained. Vertical movement of these parts is, of course, governed by appropriately shaping the active surface of the cam 141 to impart the desired up and down movement to said counting finger 16. The withdrawal of the counting finger from the stack of tissues occurs when the counting finger reaches a predetermined lower limit of movement but inward movement of the counting finger may occur at a time interval somewhat after the finger is returned to its uppermost position. The cam 143 is accordingly shaped to provide a period of rest to hold the finger in its elevated but retracted position awaiting closing of the switch 89 to cause the counting finger to be introduced into the stack to mark the beginning of a new stack of sheets.

The feed fingers 114 are operative to deliver the tissue stacks into position on the upwardly inclined slotted end portion 23b of the table 23 (see Figs. 4 and 5) in which position the double stack is gripped and then advanced and broken into two separate sections as indicated at 10a and 10b in Fig. 24. From the angularly, upwardly extending slotted portion 23b of the table, the tissue stacks are carried along an upwardly inclined path in continuation of the inclination of said slotted table portion so as to ultimately deliver the stacks at a predetermined elevation above the conveyor 12 (Figs. 1 and 2) thereby to permit dropping of the stacks on gate mechanisms 151 in overlying relation to the conveyor 12. The tissue stacks deposited on the gate pairs 151 may successively be dropped into the pockets or carriers 11 on the conveyor 12 by opening the gates 151. Suitable mechanism is provided for automatically opening the gates in timed relation to the travel of the pockets so that the tissue stacks will fall into the conveyor pockets. This mechanism is not a part of the present invention and, therefore, will not be described in detail. It will, however, be observed that the gate structure 151 is at a substantial elevation above the plane of the table 23 wherefor the tissue stacks are carried along an upwardly inclined path of travel as already referred to.

When a stack of tissues reaches the slotted table portion 23b, pressure devices or holding bars 152 (Figs. 4 and 11) are lowered into engagement with the top surface of the stack to slightly compress the stack and temporarily hold it in place on the slotted table portion. The pressure members 152 are of narrow elongated form extending transversely of and carried by a cross shaft 153 which is fixedly mounted in the ends of a pair of rock arms 154 and 155 (see also Fig. 10). These rock arms are pivoted at their other ends by means of shafts 156 on suitable bracket arms 157 which extend upwardly from the pivoted bottom shelf 25 as indicated in Fig. 4. The arms 154 and 155 together with the holding members 152 are adapted to be rocked so as to move the holding members toward and from the tissue stack. For imparting the required rocking movement to said holding members 152, the pivot shaft 156 for the arm 155 has secured to it a lever 158 (Figs. 1 and 2) which extends downwardly and is provided at its free end with a roller 159 for engaging the peripheral cam surface of a rotary cam 160. This cam 160 is secured to the driven cross shaft 130. The pressure members 152 are vertically aligned with the finger-like portions of the slotted table and portion 23b as shown in Fig. 11 so that the tissue stack will be effectively compressed when said pressure members are lowered.

Tissue material when interfolded into stacks as herein described, tends to dip in the center because of the folding at the edges, the folds being of more or less round character rather than sharp creases so that when the tissue is unfolded for use it will be free of any hard foldline. Because of this characteristic of a tissue stack (or possibly because of some other reason) the leading edges of the top sheet or sheets, tend to curl back on the stack. To prevent such curling before the holding members 152 engage the stack, there are provided a plurality of wiping rolls 161 (Figs. 4 and 10) disposed at suitable intervals across the apparatus, these wiping rolls being rocked forwardly to roll out the leading edge portions of the stacked sheets. These wiping rolls 161 are carried by arms 162 which extend from a shaft 163 which is suitably journaled as indicated at 164 on the rock arms 154 and 155. In these figures, the wiping rolls 161 are illustrated in their advanced position.

For rocking the shaft 163 and the wiping rolls 161, an arm 164 which is secured to the shaft 163, is connected to one end of a link 165 (see Fig. 4), the other end of said link being connected to the upper end of a bell crank arm 166. The bell crank comprising the arm 166 and another arm 167, is pivotally mounted as indicated at 168 on a post 169 which is pivotally supported at its lower end on the pivot shaft 27 (see Fig. 1). Said post 169 is one of a pair of such posts which serve to support other elements which will presently be referred to. The bell crank arm 167 has a roller at its free end (Fig. 4) for operatively engaging a rotary cam 170 on the shaft 130, whereby said bell crank is rocked. The link 165 is of considerable length as compared with the length of the rock arms 154 and 155 so that the movement of the shaft 163 about the pivot axis of the arms 154 and 155 does not significantly effect the movement imparted to the rollers 161 by the described cam actuated bell crank and link connections. In any event, the extent of movement of the wiping rollers 161 is not critical and requires no highly accurate setting of the starting and stopping positions thereof.

For gripping the two sections of the table stack of tissues which are clamped by the pressure members 152 against the slotted portion 23b of the table, there are provided two gripping devices designated in their entireties by the reference numerals 171a and 171b (Figs. 2 and 4), these devices being alike except that they are made right and left-hand. The following explanation of the structure and operation of the gripper 171a will therefore be understood as being also applicable to the gripper 171b with proper regard for the fact that one is of the opposite hand relative to the other. These jaw structures are moved laterally along an inclined plane so that they are operative to grip tissue stacks clamped by the members 152 on the slotted table portion 23b and carry the stacks upwardly toward the gate structure 151.

The gripping devices each comprise (Figs. 4 and 11) an upper jaw 172 and a lower jaw 173. The upper jaw 172 is of slotted plate-like form so as to provide fingers which may be moved into straddling relationship to the pressure members 152 (as indicated in Fig. 10) when the pressure members 152 are in their stack clamping position as shown in dotted lines in Fig. 4.

The jaw members 172 and 173 have hubs 174 and 175 (Fig. 11) respectively, which are secured to a sleeve 176 and this sleeve 176 is rotatably supported on a tubular post 177 which is anchored in a slide plate 178. As shown in Fig. 11, the tubular post 177 is clamped in place by means of a nut 179 which is screwed on the lower end of the post below the plate 178 and a shoulder 180 formed on the post for engagement with the upper face of said plate. The clamping jaw structure comprising the upper and lower jaws 172 and 173 is rotatable as a unit about the post 177 and also movable laterally so as to advance the gripped stacks of tissues from the table 23 to another guide table over which the stacks are fed in an endwise direction into said gate means 151 for depositing the stacks one by one on the conveyor 12.

The slide plate 178 is provided with a pair of depending lugs on each side near its front and rear ends, and suitable rollers 181 (see Figs. 4, 11 and 12) are mounted on these lugs in axially horizontal positions. These rollers 181 ride in tracks 182, 182 (Fig. 11) which are elongated in the direction of travel of the jaws. These tracks 182 are fixedly mounted on the opposite upstanding side portions of a U-shaped cradle or bed structure 183, which is supported near one end by supporting posts 184, 184 from the pivoted base shelf 25, and at its other end by the beforementioned supporting posts 169 (Fig. 1). The posts 169 are connected to the cradle structure 183 through the agency of plates 185 which depend from the upper portions of the posts 169 into engagement and attachment with said bed structure 183.

The slide plate 178 supports both jaw pairs as best shown in Fig. 11, so that when the plate 178 is moved lengthwise along the tracks 182 both jaw pairs will be simultaneously advanced.

Movement is imparted to the slide plate 178 by means of a hydraulic cylinder 186 (see Figs. 1 and 4) which is suitably supported by the plates 185 through the agency of such brackets as may be desired for that purpose. A piston rod 187 extending from said cylinder 186 is anchored at its outer or free end as indicated at 188, to a lug 189 which is part of a member 190 (Figs. 11 and 12) which is fixedly secured to the slide plate.

The admission and release of pressure fluid from the opposite ends of the cylinder 186 to reciprocate the piston 187 and the slide plate 178 are controlled by a suitable valve 191 (Figs. 8 and 9) which is actuated by a rotary cam 192 on the driven shaft 130. The cam 192 is, of course, so shaped as to adjust the valve as may be required to effect the desired reciprocation of the piston 187 and parts actuated thereby.

The lower clamping jaw 173 is normally resiliently urged upwardly toward the overlying jaw 172 by means of a coiled compression spring 193 (Fig. 11). The spring 193 is housed within the post 177 and is compressed between the bottom of the fastening nut 179 and the inner end of a collar 194. The collar 194 bears against the retaining cup 195 of an anti-friction bearing 196 and the upper portion of this cup 195 bears against the lower side or inner end of a cap 197 which is inserted in and secured to the jaw 173.

The jaw 173 is initially held down or in open position with reference to the overlying jaw 172 through the agency of a rod 198 which has its upper end anchored through the agency of said anti-friction bearing 196 to the jaw 193. The lower end of said post 198 is slidable through a slot 199 in a plate 200 and the lower end of said post 198 is provided with a roller 201 which bears against the bottom of said plate 200. The plate 200 (see Figs. 4 and 11) is pivoted as indicated at 202 between a pair of lugs 203 which depend from said slide plate 178 and said plate 200 is provided with a roller 204 which engages the under side of a longitudinally extending bar 205. This bar 205 is mounted for up and down movement so that upon downward movement of the bar it will act through the roller 204 to swing the free end of the plate 200 downwardly, thereby to act through the roller 201 and the rod 198 to pull the lower jaw member 173 downwardly or into open position relative to the overlying jaw plate 172.

The jaw opening bar 205 is provided adjacent its opposite ends with depending posts 206 which have their lower ends provided with transversely extending bearing bosses 207. The bosses 207 are disposed intermediate pairs of arms 208 and 209 (Fig. 4) and these arm pairs are pivotally mounted as indicated at 210 and 211 respectively on the bed structure 183.

The pairs of arms 208 and 209 are interconnected for simultaneous rocking movement so that the control bar 205 will be moved up and down uniformly throughout its length. The means for interconnecting said arm pairs 208 and 209 comprises a pair of links 212 and 213 which respectively have their outer ends pivoted to one of the arms of the pairs 208 and 209 and their inner or adjacent ends pivotally interconnected and pivotally secured as indicated at 214, to a rock arm 215. This rock arm 215 is pivoted for rocking movement on the under side of the bed structure 183 and has its lower or free end provided with a roller for operative engagement with a rotary cam 216 which is carried by the driven shaft 130.

After a stack of tissues is delivered into inclined position on the fingered or slotted portion 23b of the receiving table 23, the pairs of jaw structures move downwardly or toward the right (in Fig. 4) until the upper and lower jaws are disposed above and below the tissue stacks. The jaws are, of course, in open position when they move into initial stack embracing position; they are shown in closed or stack clamping position in Figs. 4 and 11. The cam 216 then permits a spring 217 (Fig. 4) to rock the arms 208 and 209 so as to cause the jaw control bar 205 to move upwardly, thereby permitting the springs 193 (Fig. 11) of the jaw structures to move the lower jaws 173 upwardly to raise the tissue stacks from the slotted table portion 23b into clamping engagement with the respective overlying jaws 172.

As gripping of the tissue stacks is effected, the valve 191 (Figs. 8 and 9) is actuated to initiate forward and upward movement of the jaws, the jaws are turned 90° about the axes of their mounting posts 177 to effect separation of the double tissue stack into two separate stacks and to turn the separate stacks through oppositely directed arcs of 90°, thereby to position the separate stacks for endwise travel along parallel but spaced paths of travel.

The mechanism for effecting turning of the jaws as an incident to their forward movement comprises (Figs. 11 and 12) a gear 218 formed on or secured to the lower end of the jaw mounting sleeve 176, this gear being engaged by a rack 219 which is slidable on the slide plate 178. The rack 219 is guided at one side by a guideway 220 formed on the adjacent side of the member 190 and at the other side by a shoulder of the slide plate 178 as will best be understood by inspection of Fig. 12. The rack bar 219 is connected by means of a link 221 to the free end of one arm 222 of a bell crank which is pivoted as indicated at 223 on an ear or lug extending from the slide plate 178. The other arm 224 of said bell crank is offset downwardly and is provided with a depending roller 225 which rides in a cam track 226 which is provided in a normally fixed track bar 227 which is mounted on said cradle member 183.

By reference to Fig. 12, it will be seen that as the slide plate 178 moves endwise toward the left, the cam track 226 will act on the roller 225 to rock the bell crank arms 224 and 222 shown in full lines in Fig. 12, in a clockwise direction thereby to advance the rack 219 relative to the slide plate. The gear 218 shown in full lines, is thereby rotated in a clockwise direction as viewed in Fig. 12. Both pairs of stack gripping jaws are rotated from the transversely extending starting position as shown in full lines in Fig. 10, to angular position indicated at A in Fig. 10 and ultimately to the parallel lengthwise extending position indicated at L in said Fig. 10. This turning movement is restricted or is not effected during the initial portion of the lateral movement of the jaws so as to permit the upstanding clamping pins 173a of the lower jaws to be moved freely out of the slots of the table portion 23b.

Due to the right and left-hand arrangement already mentioned, the jaw pairs 171a and 171b will turn in opposite directions. Accordingly, the double stack of tissues will be broken and separated into two separate stacks disposed in transversely spaced, longitudinally extending positions as indicated at 10a and 10b in Fig. 24.

When the jaw pairs have moved to their extreme left-hand position, that is to say, to the position L of Fig. 10, the tissue stacks carried by the jaws will be disposed over fingered portions 228 of inclined discharge table 229 which is suitably supported by attachment to the plates 185 and posts 169 (see Figs. 1 and 4). The fingers 228 receive between them, the jaw pins 173a whereby the tissue stacks may be delivered to positions over said fingers preparatory to depositing the stacks thereon. The jaws are opened when in their discharge position at L in Fig. 10, and begin their retractive or return movement, leaving the tissue stacks on the discharge table fingers 228. To hold the stacks on the said fingers, that is to say, to prevent the tissue stacks from returning with the jaws, there are provided gripper members 230 (Figs. 1, 4 and 10) carried by a rock shaft 231 which is journaled in suitable upstanding supports carried by the side plates 185.

The rock shaft 231 is actuated by means of an arm 232 secured to and extending laterally from the rock shaft and a link 233 which connects the free end of said rock arm 232 to a portion of the rock lever 158 as best shown in Fig. 1. The cam 160 is so shaped that it acts through the arm 158, the link 233 and rock arm 232 to hold the tissue gripping members 230 in their gripping positions during the retractive movement of the jaw pairs and until just shortly before the jaw pairs reach their fully retracted position in embracing relationship to another tissue stack on the table portion 23b. Just before the jaw pairs reach their retracted position, the cam 160 is caused to rock the arm 158 so as to effect movement of the pressure members 152 into stack compressing position, thereby to facilitate movement of the open jaw pairs into embracing relationship to the tissue stacks. This movement of the pressure members 152 also is accompanied by upward or releasing movement of the grippers 230 whereby the tissue stacks now resting on the finger portions 228 of the discharge table 229 are released. These tissue stacks, although no longer held by the grippers 230 will not normally be caused by the slight angle of the table 229 to slide downwardly but will normally remain in position until they are again positively advanced along said table 229. Any downward sliding of the tissue stacks will, however, be arrested by engagement of the tissue stacks with pairs 234 of feeding fingers (see Figs. 4 and 10) which are disposed immediately adjacent the receiving ends of fingers 228 as shown in Figs. 4 and 10. These feed fingers 234 are pivotally mounted in blocks 235 which are carried by forwardly extending bars 236, the latter being rigidly mounted through the agency of suitable brackets 237 on the slide plate 178. The bars 236 are elongated and have advance sets of feed fingers 238 mounted thereon, the fingers 238 being similar in character to the fingers 234.

It will be seen that when the jaws 172 and 173 begin their advancing movement, the feed fingers 234 and 238 will be correspondingly advanced so that the fingers 234 will be operative to engage and advance the tissue stacks which were previously delivered to the table fingers 228 by said jaw pairs 172 and 173. Similarly, the feed fingers 238 will be operative to advance tissue stacks which were previously advanced by the fingers 234. The fingers 234 and 238 are yieldingly held in their upwardly extending positions as shown in Fig. 4, and they, like the feed fingers 114, are so pivoted in their supporting blocks that during retractive movement these fingers may rock about their pivots so as to pass under the tissue stacks resting on the overlying table 229 and fingers 228. As soon as the fingers pass the overlying stacks they spring up to their operative upwardly extending position as shown in Fig. 4.

To temporarily hold advance tissue stacks in place on the discharge table 229, another pair of stack gripping jaws 239 (Fig. 1) is positioned over the table 229 and mounted on a rock shaft 240 which is actuated by connections comprising a rock arm 241 and link 242, to the rock arm 232. Hence, the gripping members 239 will be actuated simultaneously with the gripping members 230.

The tissue stack which is temporarily held in place by the advanced grippers 239 will be fed forwardly to the drop gates 151 as an incident to the forward movement of the next succeeding tissue stacks, the latter will be fed forwardly by the feed fingers 238 into engagement with the proceeding stacks whereby the latter will be moved forwardly into position on said dropping gates 151 by means of which the stacks are deposited on the conveyor 12.

The described stack forming, breaking and turning mechanism is, in its entirety, supported from the pivotally mounted base shelf 25 so that all of the stack handling mechanism will remain in cooperative relation throughout the various positions to which the tissue receiving and stack forming or segregating mechanism may be adjusted relative to the interfolding rolls. Hence, adjustment of said tissue receiving and stack segregating structure may be made to secure the most advantageous relationship to interfolding rolls withotu requiring readjustment of the other elements of mechanism which handle the tissue stacks.

Pressure fluid for actuating the various parts which are hydraulically operated may be supplied from a suitable pump and fluid storage mechanism indicated in its entirety at 243 (Figs. 1 and 2) which is actuated by an electric motor 244. Suitable conduits (not shown) connect the hydraulic pressure unit 243 through the various valves to the said hydraulic cylinders. The described structure is herein illustrated largely in the manner in which it was initially constructed and it is, of course, subject to many refinements and changes while retaining the principles thereof and without departing from the scope of the invention.

We claim:

1. Apparatus of the class described comprising the combination of means for piling sheet material on top of a stack of such material, means for supporting said stack, a marker and means for moving and retracting said marker into and from overlying position relative to said stack, a table underlying said stack supporting means, means for withdrawing said supporting means from under said stack so as to deposit said stack on said table and for effecting reinsertion of said supporting means in the stack at the location of said marker when overlying the stack, means for effecting downward movement of said table so as to separate that portion of the stack deposited thereon from that portion which overlies the reinserted supporting means, and means for feeding said separated stack portion from said lowered table.

2. In apparatus of the class described, the combination of means for continuously depositing sheet material on the top of a stack of such material, stack supporting means mounted for vertical and horizontal movement relative to said stack, a marker and means for moving and retracting said marker into and from a position overlying the top of said stack for downward movement therewith, a vertically movable table underlying said stack supporting means, means for effecting horizontal withdrawal of said supporting means from under said stack so as to deposit said stack on said table and for effecting reinsertion of said supporting means in said stack at the location of said marker when overlying the stack, means for effecting downward movement of said reinserted supporting means at a speed substantially conforming to the rate at which the depth of the stack is increased by the piling of additional material on top of the stack, means for effecting downward movement of said table at a greater rate of travel than said supporting means, thereby to separate that portion of the stack deposited thereon from that portion which overlies the reinserted supporting means, and means for feeding said separated stack portion from said lowered table.

3. In apparatus of the class described, the combination of means for piling sheet material on the top of a stack of such material, means for supporting said stack, a marker and means for moving and retracting said marker into and from an overlying position on top of said stack, a table underlying said stack supporting means, means for withdrawing said supporting means from under said stack so as to deposit the same on said table and for effecting reinsertion of said supporting means in the stack at the location of said marker when overlying the stack, and means for effecting removal from said table of the stack portion deposited thereon as aforesaid.

4. In apparatus of the class described, the combination of means for piling sheet material on the top of a stack of such material, means for supporting said stack, a marker and means for moving and retracting said marker into and from an overlying position on top of said stack, a table underlying said stack supporting means, means for withdrawing said supporting means from under said stack so as to deposit the same on said table and for effecting reinsertion of said supporting means in the stack at the location of said marker when overlying the stack, and means for moving the stack portion deposited on said table laterally therefrom.

5. In apparatus of the class described, the combination of means for delivering folded sheet material fold by fold on top of a stack of such material, a plate for supporting said stack, a marker and means for moving and retracting said marker into and from an overlying position relative to a portion of said stack, a table underlying said stack supporting plate, means for withdrawing said plate from under said stack so as to deposit the same on said table and for effecting reinsertion of said plate in the stack at the location of said marker when in said overlying position, means for effecting downward movement of said table relative to said plate so as to space that portion of the stack deposited on said table from that portion which overlies the reinserted plate, a fold of said material connecting said plate supported stack portion to said table supported portion being thereby caused to extend across the space between said stack portions, a laterally movable separating blade movable into said space and operative to effect severance of said connection between said stack portions, thereby to separate the stack deposited on said table from said plate supported portion.

6. In apparatus of the class described, the combination of means for delivering folded sheet material fold by fold on top of a stack of such material, said sheet material being provided with incomplete lines of severance leaving readily breakable bonds therein, a plate for supporting said stack, a marker and means for moving and retracting said marker into and from an overlying position relative to a portion of said stack, a table underlying said stack supporting plate, means for withdrawing said plate from under said stack so as to deposit the same on said table and for effecting reinsertion of said plate in the stack at the location of said marker when in said overlying position, means for effecting downward movement of said plate at a predetermined rate of speed, means for effecting downward movement of said table at a speed which is greater than the speed of downward movement of said plate, thereby to space that portion of the stack deposited on said table from that portion which overlies the reinserted plate, a fold of said material connecting said plate supported stack portion to said table supported portion being thereby caused to extend across the space between said stack portions, a laterally movable separating blade movable into said space and operative to engage and move said connecting sheet portion laterally so as to break adjacent bonds in said material, thereby to separate the stack portion deposited on said table from said plate supported portion.

7. In apparatus of the class described, the combination of means for delivering folded sheet material fold by fold on top of a stack of such material, said sheet material being provided with incomplete lines of severance leaving readily breakable bonds at alternate folds therein, a plate for supporting said stack, a marker and means for moving and retracting said marker into and from an overlying position relative to a portion of said stack, a table underlying said stack supporting plate, means for withdrawing said plate from under said stack so as to deposit the same on said table and for effecting reinsertion of said plate in the stack at the location of said marker when in said overlying position, means for effecting downward movement of said plate at a rate of speed substantially conforming to the rate at which the thickness of said stack is increased by the delivery of sheet material as aforesaid, means for effecting downward movement of said table at a speed which is greater than the speed of downward movement of said plate, thereby to space that portion of the stack deposited on said table from that portion which overlies the reinserted plate, a fold of said material connecting the plate-supported stack portion to the table-supported portion being thereby caused to extend across the space between said stack portions, a laterally movable separating blade movable into said space and operative to engage and tension said connecting sheet portion so as to break the bonds in an adjacent fold thereby to disconnect the stack portion deposited on said table from said plate supported portion so as to free the former for discharge from the apparatus.

8. In apparatus of the class described, the combination of means for delivering folded sheet material fold by fold on top of a stack of such material, said sheet material being provided with incomplete lines of severance leaving readily breakable bonds at alternate folds therein, a plate for supporting said stack, a marker and means for moving and retracting said marker into and from an overlying position relative to a portion of said stack, a table underlying said stack supporting plate, means for withdrawing said plate from under said stack so as to deposit the same on said table and for effecting reinsertion of said plate in the stack at the location of said marker when in said overlying position, means for effecting downward movement of said plate at a rate of speed substantially conforming to the rate at which the thickness of said stack is increased by the delivery of sheet material as aforesaid, means for effecting downward movement of said table at a speed which is greater than the speed of downward movement of said plate, thereby to space that portion of the stack deposited on said table from that portion which overlies the reinserted plate, a fold of said material connecting the plate-supported stack portion to the table-supported portion being thereby caused to extend across the space between said stack portions, a laterally movable separating blade movable into said space and operative to engage and tension said connecting sheet portion so as to break the bonds in an adjacent fold thereby to disconnect the stack portion deposited on said table from said plate supported portion, and means carried by said separating blade for engaging the stack on said table and effecting discharge of the stack from said table as an incident to continued movement of said separating blade.

9. In apparatus of the class described, the combination of means for delivering folded sheet material fold by fold on top of a stack of such material, said sheet material being provided with incomplete lines of severance leaving readily breakable bonds at alternate folds therein, a plate for supporting said stack, a marker and means for moving and retracting said marker into and from an overlying position relative to a portion of said stack, a table underlying said stack supporting plate, means for withdrawing said plate from under said stack so as to deposit the same on said table and for effecting reinsertion of said plate in the stack at the location of said marker when in said overlying position, means for effecting downward movement of said plate at a rate of speed substantially conforming to the rate at which the thickness of said stack is increased by the delivery of sheet material as aforesaid, means for moving said table up and down relative to said plate, said downward movement being effected at a speed which is greater than the speed of downward movement of said plate, thereby to space that portion of the stack deposited on said table from that portion which overlies the reinserted plate, a fold of said material connecting the plate-supported stack portion to the table-supported portion being thereby caused to extend across the space between said stack portions, a laterally reciprocable separating blade movable into said space and operative to engage and tension said connecting sheet portion so as to break the bonds in an adjacent fold thereby to disconnect the stack portion deposited on said table from said plate supported portion, means carried by said separating blade for engaging the stack on said table and effecting discharge of the stack from said table as an incident to continued movement of said separating blade, said separating blade and stack discharging means being movable laterally intermediate said plate and table, and said table moving means being operative to move said table upwardly to a position immediately under said plate after retraction of said blade is effected, thereby to position said table for receiving another stack from said stack supporting plate.

10. In apparatus of the class described, the combination of means for delivering folded sheet material fold by fold on top of a stack of such material, said sheet material being provided with incomplete lines of severance leaving readily breakable bonds therein, a plate for supporting said stack, a marker and means for moving and retracting said marker into and from an overlying position relative to a portion of said stack, a table underlying said stack supporting plate, means for withdrawing said plate from under said stack so as to deposit the same on said table and for effecting reinsertion of said plate in the stack at the location of said marker when in said overlying position, means for effecting downward movement of said plate at a predetermined rate of speed, means for effecting downward movement of said table at a speed which is greater than the speed of downward movement of said plate, thereby to space that portion of the stack deposited on said table from that portion which overlies the reinserted plate, a fold of said material connecting said plate supported stack portion to said table supported portion being thereby caused to extend across the space between said stack portions, a separating blade, means for effecting both horizontal and downward movement of said separating blade in the space between said stack portions so as to cause said blade to press the top of the table supported stack downwardly and to apply laterally directed force to said connecting fold, thereby to effect tensioning of the same and breaking of the bonds uniting said connecting fold with one of said stack portions, whereby the table supported stack portion is separated from said plate supported portion.

11. In apparatus of the class described, the combination of means for folding sheet material, a vertically movably mounted plate for receiving the folded material from said folding means, means for effecting downward movement of said plate at a predetermined speed, means cooperating with said plate for receiving therefrom predetermined stacks of said folded material, discharging the stacks, and cyclicly returning said plate to predetermined starting position, and means for mounting said stack receiving plate and the means cooperating therewith as aforesaid for unitary adjustment toward and from said folding means.

12. In apparatus of the class described, the combination of means for folding sheet material, a normally fixed frame structure supporting said folding means, a shelf mounted for vertical adjustment relative to said main frame and folding means, and means carried by said shelf for receiving the folded web from said folding means and for effecting segregation of the folded material into predetermined stacks, said receiving and stack segregating means being vertically adjustable as a unit toward and from said folding means as an incident to vertical adjustment of said shelf, thereby facilitating adjustment of the operative relationship between said receiving and segregating means as a unit relative to said folding means while maintaining a fixed relationship between the elements of said receiving and segregating means.

13. In apparatus of the class described, the combination of means for continuously delivering sheet material into a stack, a main frame structure supporting said material delivering means, a shelf structure mounted in said main frame for vertical movement relative thereto, a plate vertically adjustably mounted on said shelf structure for receiving the material from said delivering means, cam mechanism mounted on said shelf for effecting vertical reciprocation of said plate according to a predetermined pattern, means cooperating with said plate to receive therefrom predetermined stacks of said material, said cooperating means comprising a laterally reciprocable separator blade mounted on said shelf, reciprocating means for effecting reciprocation of said blade, said blade being pivotally connected on a horizontal axis to said reciprocating means whereby said blade is also vertically movable about the axis of said pivot connection, and cam means for effecting vertical adjustment of said blade about said pivot connection as an incident to reciprocation of said blade.

14. In apparatus of the class described, the combination of means for folding a continuous web of sheet material, a main frame structure for supporting said folding means, a plate vertically and horizontally reciprocably mounted in said frame structure for receiving folded webbing from said folding means, means for independently effecting vertical and horizontal reciprocation of said plate according to a predetermined cycle of operation, a marker horizontally and vertically reciprocably mounted on said frame structure for movement into and from an overlying position relative to a portion of said stack and vertically with and counter to the downward movement of said stack on said plate, a table vertically reciprocably mounted in said frame structure in underlying relation to said plate, means for effecting reciprocation of said table in accordance with a predetermined cycle of operation, said plate, marker and table being actuated so as to deposit successive predetermined stacks of folded material on said table and to effect lowering of said table relative to said plate when in stack supporting position to thereby space the table supported stack from the plate supported stack, a separating blade mounted in said frame structure for horizontal reciprocating movement into and through space formed between said table and plate supported stacks to thereby effect separation of the table supported stack from the plate supported stack, means carried by said frame structure for effecting reciprocation of said separator blade for engaging the separated stacks and operative to discharge the same from said table as an incident to continuation of the stack separating movement of said blade, and a normally stationary table for successively receiving stacks discharged as aforesaid from said vertically movable table.

15. In apparatus of the class described, the combination of means for folding a continuous web of sheet material, a main frame structure for supporting said folding means, a plate vertically and horizontally reciprocably mounted in said frame structure for receiving folded webbing from said folding means, means for independently effecting vertical and horizontal reciprocation of said plate according to a predetermined cycle of operation, a marker horizontally and vertically reciprocably mounted on said frame structure for movement into and from an overlying position relative to a portion of said stack and vertically with and counter to the downward movement of said stack on said plate, a table vertically reciprocably mounted in said frame structure in underlying relation to said plate, means for effecting vertical reciprocation of said table in accordance with a predetermined cycle of operation, said plate, marker and table being actuated so as to deposit successive predetermined stacks of folded material on said table and to effect lowering of said table relative to said plate when in stack supporting position to thereby space the table supported stack from the plate supported stack, a separating blade mounted in said frame structure for horizontal reciprocating movement into and through space formed between said table and plate-supported stacks to thereby effect separation of the table supported stack from the plate supported stack, means carried by said frame structure for effecting reciprocation of said separator blade, a pusher depending from said separator blade, for engaging the separated stacks and operative to discharge the same from said table as an incident to continuation of the stack separating movement of said blade, a normally stationary table for successively receiving stacks discharged as aforesaid from said vertically movable table, and feeding means connected to said separating blade and reciprocable therewith for engaging and advancing the stacks delivered to said normally stationary table as aforesaid.

16. Apparatus according to claim 15, wherein the last mentioned stack feeding means comprises a pivoted finger which is operative in one direction of movement to engage and advance the stack and which is operative upon retraction to rock on its pivot to an inoperative position wherein the finger is permitted to pass under a stack of material delivered to the normally fixed table by the separator-carried pusher means.

17. In apparatus of the class described, the combination of means for folding a web of sheet material, a main frame structure for supporting said folding means, a plate vertically and horizontally reciprocably mounted in said frame structure for receiving folded webbing from said folding means, means for independently effecting vertical and horizontal reciprocation of said plate according to a predetermined cycle of operation, a marker horizontally and vertically reciprocably mounted on said frame structure for movement into and from an overlying position relative to a portion of said stack and vertically with and counter to the downward movement of said stack on said plate, a table vertically reciprocably mounted in said frame structure in underlying relation to said plate, means for effecting vertical reciprocation of said table in accordance with a predetermined cycle of operation, said plate, marker and table being actuated so as to deposit successive predetermined stacks of folded material on said table and to effect lowering of said table relative to said plate when in stack supporting position to thereby space the table supported stack from the plate supported stack, a separating blade mounted in said frame structure for horizontal reciprocating movement into and through space formed between said table and plate supported stacks to thereby effect separation of the table supported stack from the plate supported stack, means carried by said frame structure for effecting reciprocation of said separator blade, a pusher depending from said separator blade for engaging the separated stacks and operative to discharge the same from said table as an incident to continuation of the stack separating movement of said blade, a normally stationary table structure for receiving the stacks discharged as aforesaid from said vertically movable table, and means associated with said stationary table for holding stacks delivered to said table against retraction with said separator blade.

18. Apparatus according to claim 17 in which the last mentioned stack holding means comprises a gripper structure pivotally mounted on said stationary table for movement toward and from the table in position to effect clamping of the delivered stacks to said stationary table, and means for rocking said clamping means in timed relation with the delivery of stacks to said table.

References Cited in the file of this patent

UNITED STATES PATENTS

| Number | Name | Date |
|--------|------|------|
| 1,182,296 | Morden | May 9, 1916 |
| 1,290,801 | Teall | Jan. 7, 1919 |
| 1,489,892 | Loughridge | Apr. 8, 1924 |
| 1,860,223 | Bingham | May 24, 1932 |
| 2,081,580 | Diffenderffer | May 25, 1937 |
| 2,205,767 | Lamb | June 25, 1940 |